US012745216B2

(12) United States Patent
Xu et al.

(10) Patent No.: US 12,745,216 B2
(45) Date of Patent: Sep. 22, 2026

(54) PAGING ALERT CHANNEL

(71) Applicant: QUALCOMM Incorporated, San Diego, CA (US)

(72) Inventors: Huilin Xu, Temecula, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/338,999

(22) Filed: Jun. 21, 2023

(65) Prior Publication Data

US 2024/0430858 A1 Dec. 26, 2024

(51) Int. Cl.
*H04W 68/02* (2009.01)

(52) U.S. Cl.
CPC .................................. *H04W 68/02* (2013.01)

(58) Field of Classification Search
None
See application file for complete search history.

(56) References Cited

U.S. PATENT DOCUMENTS

2020/0245288 A1* 7/2020 Liu ..................... H04W 68/025
2021/0337626 A1* 10/2021 John ..................... H04W 76/40
2024/0340074 A1* 10/2024 Yan ................... H04W 56/0005

OTHER PUBLICATIONS

3GPP TS 38.300 V17.4.0: "3rd Generation Partnership Project, Technical Specification Group Radio Access Network, NR; NR and NG-RAN Overall Description, Stage 2 (Release 17)", 38300-H40, Mobile Competence Centre, 650, Route Des Lucioles, F-06921 Sophia-antipolis Cedex, France, Mar. 28, 2023, pp. 1-210, XP052353474, D3, section 9.2.5, p. 93-p. 96.

3GPP TS 38.304 V17.4.0: "3rd Generation Partnership Project, Technical Specification Group Radio Access Network, NR, User Equipment (UE) procedures in Idle mode and RRC Inactive state (Release 17)", 3GPP Standard, Technical Specification, Mobile Competence Centre, 650, Route Des Lucioles, F-06921 Sophia-antipolis Cedex, France, vol. RAN WG2, No. V17.4.0 Apr. 3, 2023, pp. 1-51, XP052284518, p. 41, section 7.1, 1.2-3, p. 44, section 7.3.0, 1. 1-2.

Hughes/Echostar: "Paging Alert Channel for NR NTN Downlink Coverage Enhancement", 3GPP TSG RAN Meeting #99, RP-230272, Rotterdam, Netherlands, Mar. 20-23, 2023, pp. 1-4, XP093190021, Mar. 13, 2023, p. 3, lines 16-34.

International Search Report and Written Opinion—PCT/US2024/028476—ISA/EPO—Aug. 16, 2024.

Nokia., et al., "Remaining details on search space", 3GPP TSG RAN WG1 #92bis, R1-1805517_SEARCHSPACE_NOK, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018, 14 Pages, XP051427509, p. 7, proposal 6.

* cited by examiner

*Primary Examiner* — Frantz Bataille
(74) *Attorney, Agent, or Firm* — Procopio, Cory, Hargreaves & Savitch LLP

(57) ABSTRACT

In an aspect, a UE may receive, from a network node, an indication of a PAC, wherein the indication is associated with at least a subset of subgroup identifiers of a plurality of UEs associated with a same paging occasion, wherein each of the plurality of UEs is configured to receive the indication of the PAC associated with the same paging occasion. The UE may also communicate at least one message with the network node based on the indication of the PAC.

30 Claims, 15 Drawing Sheets

One Frame (TDD)
10 ms
subframe
slot
RB
200

D D D D D D D D D D D D F U
subcarrier
OFDM symbol
slot
DMRS R
CSI-RS
230
PDCCH CORESET
SSS
PSS
PDSCH
PBCH
REG 12 REs
1 CCE = 6 REGs
SS/PBCH Block
BWP
BWP
20 RBs
channel bandwidth RBs One Frame (TDD)
10 ms
subframe
slot
RB
250

U U U U U U U U U U U U U U
subcarrier
OFDM symbol
slot
SRS
SRS Comb 0
SRS Comb 1
DMRS R
280
PUCCH
PUSCH

PAGING ALERT CHANNEL

TECHNICAL FIELD

The present disclosure relates generally to communication systems, and more particularly, to paging-related communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine e communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include memory and at least one processor coupled to the memory. The at least one processor, individually or in any combination, based at least in part on information stored in the memory may be configured to receive, from a network node, an indication of a paging alert channel (PAC), where the indication is associated with at least a subset of subgroup identifiers (IDs) of a plurality of UEs associated with a same paging occasion, where each of the plurality of UEs is configured to receive the indication of the PAC associated with the same paging occasion, and to communicate at least one message with the network node based on the indication of the PAC.

In another aspect of the disclosure, a method, a computer-readable medium, and an apparatus at a network node are provided. The apparatus may include memory and at least one processor coupled to the memory. The at least one processor, individually or in any combination, based at least in part on information stored in the memory may be configured to provide, for at least one user equipment (UE), an indication of a paging alert channel (PAC), where the indication is associated with at least a subset of subgroup IDs of at least one UE associated with a same paging occasion, where each of the at least one UE is configured to receive the indication of the PAC associated with the same paging occasion, and to communicate at least one message with the at least one UE based on the indication of the PAC.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
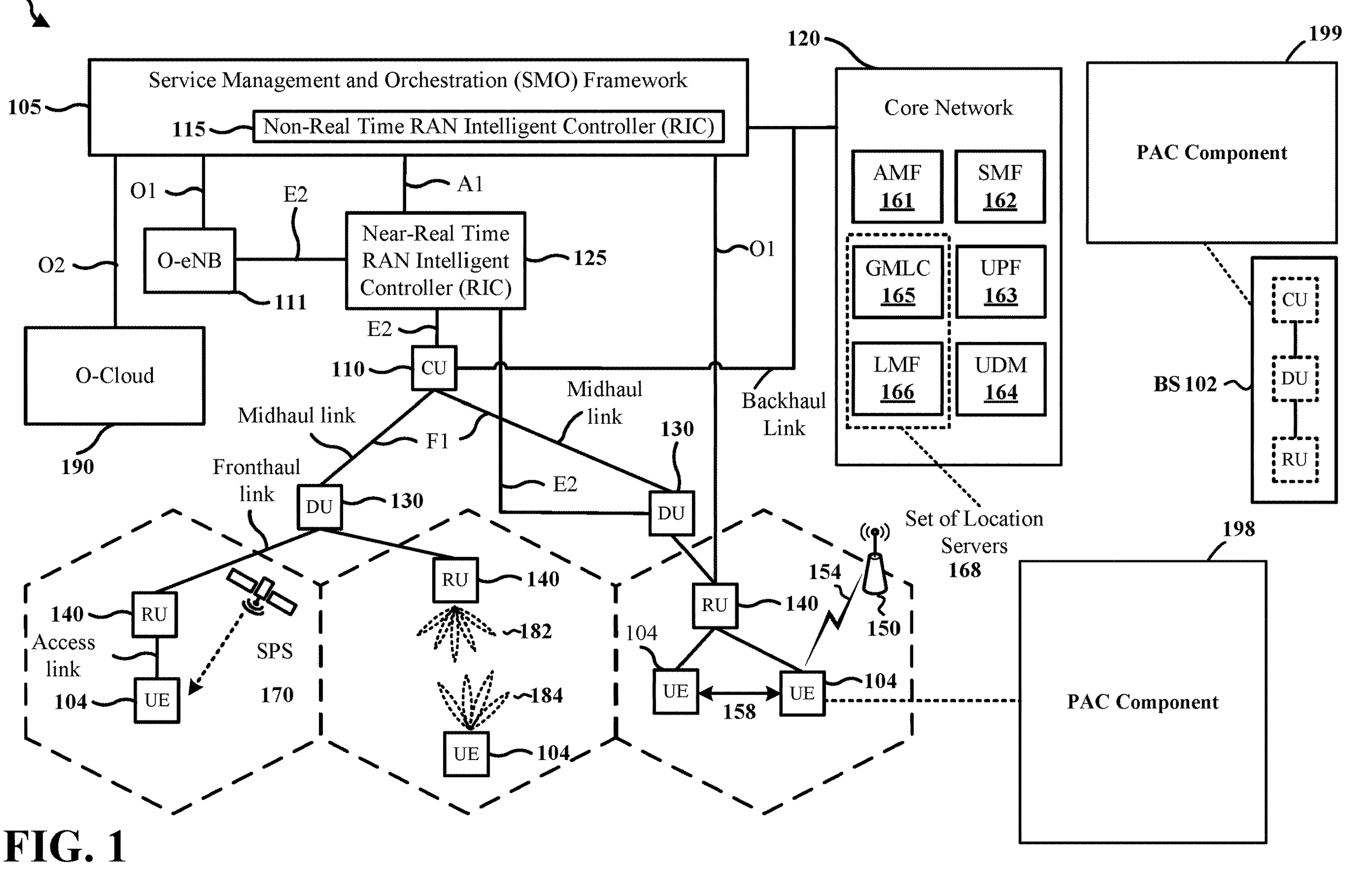
FIG. 1 is a diagram illustrating an example of a wireless communications system and an access network.

Various aspects of the present disclosure, in connection with the accompanying drawings, relate generally to communication systems. Some aspects more specifically relate to a paging alert channel (PAC) for providing paging messages to a UE. For instance, a UE may receive, from a network node, an indication of a PAC. The indication may be associated with at least a subset of subgroup identifiers of at least one UE associated with a same paging occasion. Each UE may be configured to receive the indication of the PAC associated with the same paging occasion. The UE and network node may communicate at least one message based on the indication of the PAC. In some aspects, the PAC may have a relatively small size so that the probability of a missed detection is low, may be encoded and protected by cyclic redundancy checking, thereby providing a relatively low false alarm probability so that false human intervention may not be frequently specified, and may provide a per-user indication.

Particular aspects of the subject matter described in this disclosure can be implemented to realize one or more of the following potential advantages. In some examples, by providing a relatively small size PAC and protecting the PAC via cyclic redundancy checking, the likelihood that the UE receives and decodes paging messages received via a PAC increases. This enables the UE (and/or a user thereof) to properly receive paging messages and act appropriately. For example, the UE may switch from an idle mode to a connected mode in response to receiving a paging message. In another example, the UE may properly receive an alert (via a paging message that alerts a user of the UE of a public safety, an emergency, or threat alert), thereby enabling the user to take the necessary precautionary measures. By providing a per-user indication, a UE may determine whether a paging message is intended therefor utilizing less compute resources (e.g., processing cycles, memory, power, etc.).

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a PAC component 198 that may be configured to receive, from a network node, an indication of a PAC where the indication is associated with at least a subset of subgroup IDs of a plurality of UEs associated with a same paging occasion, where each of the plurality of UEs is configured to receive the indication of the PAC associated with the same paging occasion, and to communicate at least one message with the network node based on the indication of the PAC. In certain aspects, the base station 102 may have a PAC component 199 that may be configured to provide, for at least one UE, an indication of a PAC, where the indication is associated with at least a subset of subgroup IDs of at least one UE associated with a same paging occasion, where each of the at least one UE is configured to receive the indication of the PAC associated with the same paging occasion, and to communicate at least one message with the at least one UE based on the indication of the PAC.

Figures 2A, 2B, 2C, 2D:
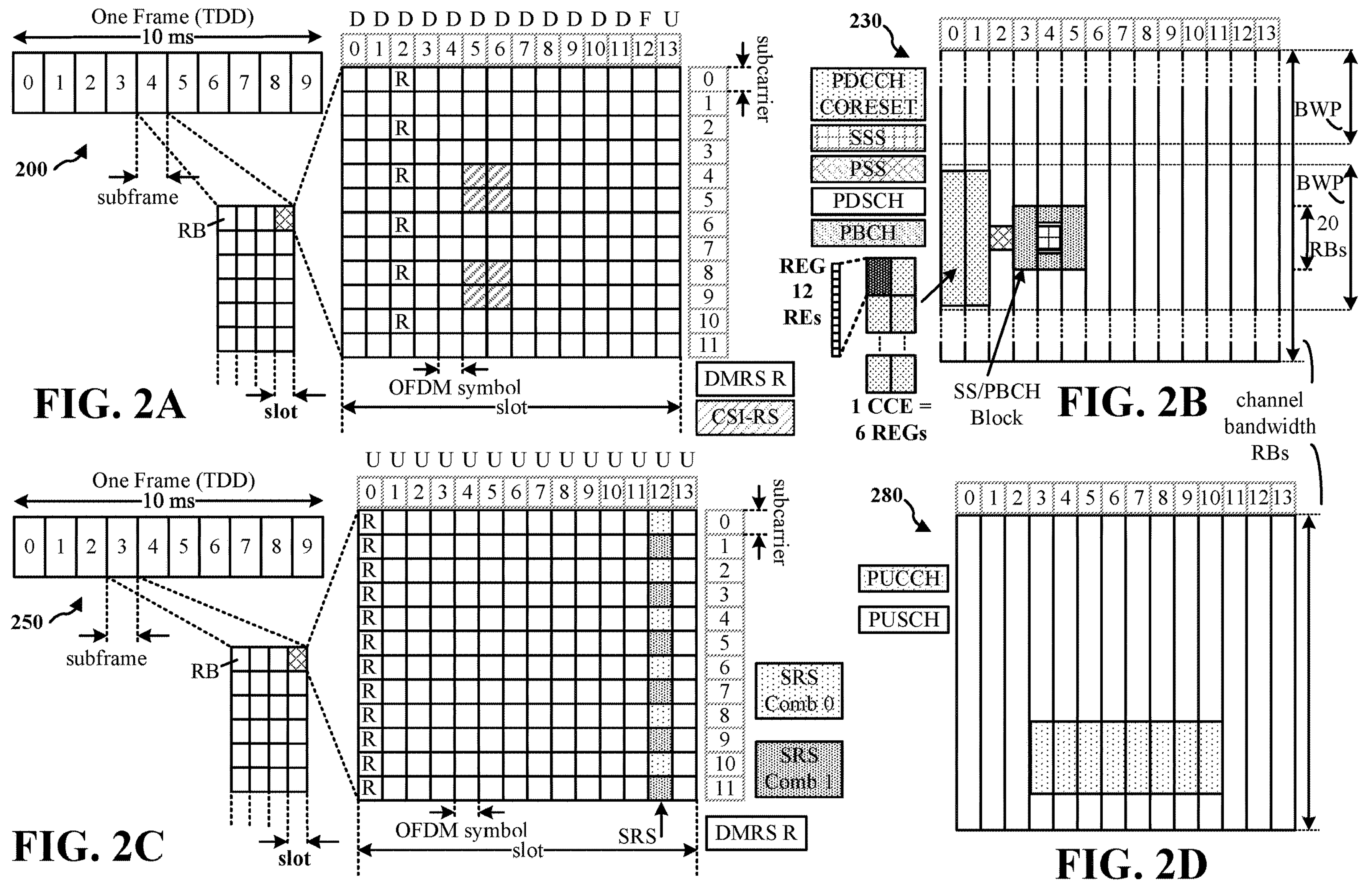
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A set of RBs configured to the UE where the UE monitors for PDCCHs within one BWP may be referred to as a control resource set (CORESET). A UE may be configured to monitor PDCCH candidates (e.g., PDCCHs that may be designated for the UE) in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell ID (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
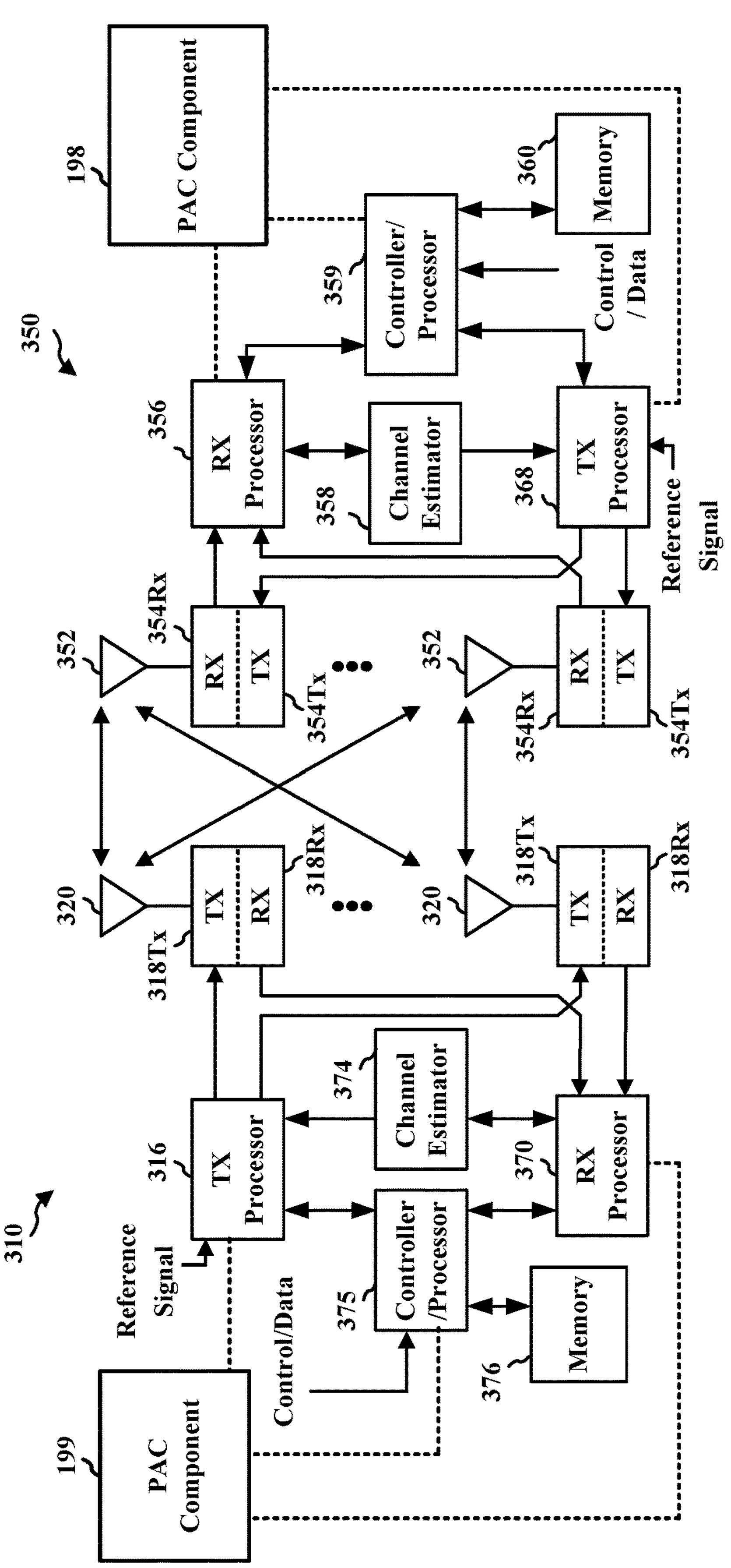
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the PAC component 198 of FIG. 1.

At least one of the TX processor 316, the RX processor 370, and the controller/processor 375 may be configured to perform aspects in connection with the PAC component 199 of FIG. 1.

For mobile-originated (MO) calls in a non-terrestrial network (NTN), users may be aware of the channel condition and may actively adjust the orientation of the phone or move to a spot with better NTN coverage. This may help alleviate the NTN coverage issue for MO cases. Downlink coverage issues may be more harmful for mobile-terminated (MT) calls for idle and inactive UEs. UEs in a pocket, backpack, car, or that are blocked by a building or foliage are subject to additional path loss. Users may not be aware of incoming calls and even paging messages may not be decoded, and therefore, the network may not connect to the UEs.

In accordance with various aspects of the present disclosure, a paging alert channel (PAC) may be utilized to mitigate downlink coverage issues. The PAC may be a PDCCH configured for the transmission and reception of paging messages. The PAC may have particular characteristics differentiating it from a paging PDCCH. For instance, the PAC may be more reliably detected (e.g., with a higher probability than a paging PDCCH). The PAC may have a relatively small size so that the probability of missed detection is low. A relatively small PAC may make paging PDCCH unsuitable for the PAC because paging PDCCH already has a minimum size of 28 bits plus bits for frequency domain resource allocation (FDRA) for paging PDSCH scheduling. The PAC may have a low false alarm probability so that false human intervention is not frequently needed. For example, the PAC may be protected utilizing cyclic redundancy check (CRC) bits. As such, sequence-based signaling may be unsuitable for a PAC. The PAC may provide a per-user indication. As such, a paging early indication (PEI) (e.g., an indication provided before a paging message is provided to a UE) may not be suitable for a PAC, as there is at most one PEI PDCCH for all users associated with each paging occasion (PO). The UE may not rely on paging PDSCH, as it is more vulnerable to the additional DL path loss. In some aspects, there may be a multiple-to-one mapping between PACs and a PO for UEs associated with the same PO. The PAC may be encoded and protected via CRC.

In some aspects, the PAC may be PDCCH, but not sequence-based signaling, which has no coding and CRC protection. A framework based on a PEI PDCCH framework may be utilized. A PEI may indicate whether any UE in a subgroup of users associated with a PO is paged. A maximum number of 8 subgroups per PO may be configured for a PEI by the network. The PEI PDCCH payload may include a bitmap. Each bit in the bitmap may indicate a subgroup. A PEI may indicate users for up to 8 POs in one or two consecutive paging frames. The PEI may be monitored in a dedicated PEI search space. The first PDCCH monitoring occasion (PMO) for a PEI occasion may be determined by a frame-level offset from the first paging frame of POs indicated by the PEI, and a symbol-level offset.

Figure 4:
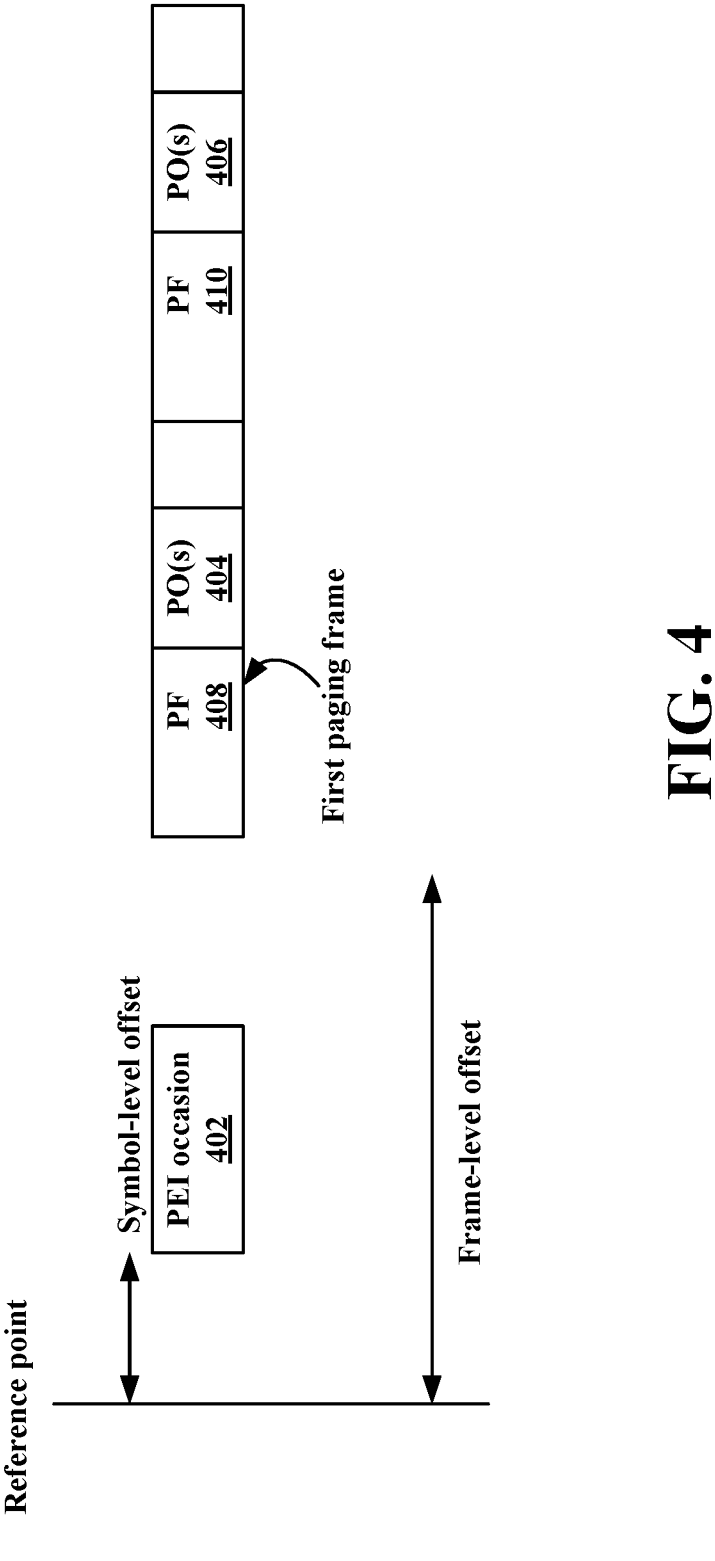
FIG. 4 is a block diagram illustrating a paging early indication occasion and paging frames in accordance with various aspects of the present disclosure.

For example, FIG. 4 is a block diagram 400 illustrating a PEI occasion and paging frames in accordance with various aspects of the present disclosure. As shown in FIG. 4, a PEI occasion 402 may be determined by a frame-level offset and a symbol-level offset with respect to a reference point. The reference point may be the start of a system frame that is a frame-level offset before the paging frame that contains the first PO indicated by the PEI. The PEI occasion may indicate users for up to 8 POs (e.g., PO(s) 404 and/or PO(s) 406) in one or two consecutive paging frames (e.g., paging frames 408 and/or 410). The PEI PMOs of the same PEI occasion (e.g., PEI occasion 402) may be associated with multiple PO(s) (e.g., PO(s) 404 and PO(s) 406). A UE associated with any of the POs may monitor the PEI PDCCH within this PEI occasion.

In accordance with various aspects of the present disclosure, to support a finer paging indication granularity (e.g., a per-UE indication), the PEI PDCCH framework may be modified and/or extended to cover more subgroups of the same PO indicated by the PAC. The maximum supported number of subgroups may be greater than 8 (e.g., ~1000 subgroups per PO). In some aspects, multiple PACs associated with the same PO may be time division multiplexed.

In some aspects, a number of subgroups per PO larger than 8 (e.g., $\{12, 12*2^n, 16, 16*2^m\}$) may be supported, where n and m are any positive integer value. In some aspects, because the payload size of the PAC is relatively small (e.g., the minimum PDCCH payload size is 12 bits for NR), one PAC PDCCH may not be able to indicate all subgroups of the same PO (the PEI indicates subgroups of UEs associated with a PO). In some aspects, a PAC indicates a subset of subgroups of the same PO (meaning that multiple PACs may be utilized to indicate all subgroups of the same PO).

In some aspects, a PAC of the multiple PACs may be associated with a subset of subgroups of the same PO by at least one of PDCCH candidate indexes in the PAC PMO, PAC radio network temporary identifiers (RNTIs), or PAC PMOs. A PDCCH candidate index may indicate a particular PDCCH candidate of all PDCCH candidates configured in the same PAC PMO. A PDCCH candidate may a potential PAC PDCCH that may be utilized by a UE for receiving paging messages. For the PDCCH candidate indexes, a subset of subgroups may be associated with a particular PDCCH candidate (corresponding to a particular candidate index) within the PMO. For instance, for the PAC RNTIs, multiple UE group-based RNTIs may be assigned for PAC transmission, and a subset of subgroups may be associated with a particular RNTI of the multiple UE group-based RNTIs. For the PAC PMOs, PACs indicating different subsets of subgroups may be transmitted in a time division multiplexed manner in different PMOs.

Figure 5:
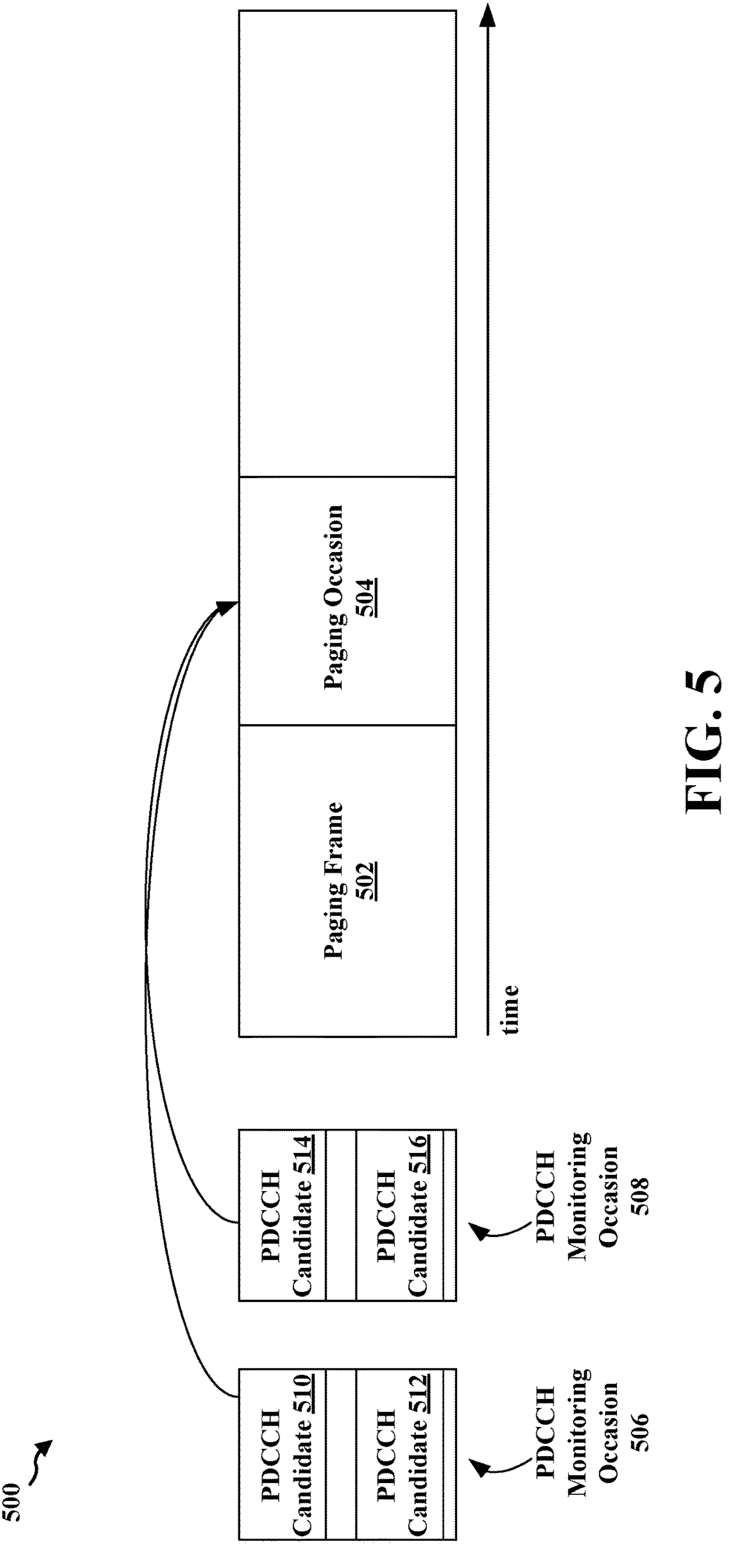
FIG. 5 depicts a diagram illustrating the association between multiple paging alert channels with subsets of subgroups of the same paging occasion in accordance with various aspects of the present disclosure.

FIG. 5 depicts a diagram 500 illustrating the association between a PAC of the multiple PACs with a subset of subgroups of the same PO in accordance with various aspects of the present disclosure. As shown in FIG. 5, a paging frame 502 may include a paging occasion 504. The paging occasion 504 may include at least one slot (e.g., of the paging frame 502) in which the network may transmit a paging PDCCH. A plurality of PMOs (e.g., the PMO 506 and the PMO 508) may be associated with the paging occasion 504. Each of the PMO 506 and the PMO 508 may include a plurality of PAC PDCCH candidates configured by the network. For example, the PMO 506 may include a PAC PDCCH candidate 510 and a PAC PDCCH candidate 512, and the PMO 508 may include a PAC PDCCH candidate 514 and a PAC PDCCH candidate 516. In the example shown in FIG. 5, two PDCCH candidates in one of two PMOs are used to transmit PACs for subgroups for the same PO. For example, the PAC PDCCH candidate 510 and the PAC PDCCH candidate 512 in the PMO 506 may be utilized to transmit PACs for subgroups for the same PO. In another example, the PAC PDCCH candidate 514 and the PAC PDCCH candidate 516 in the PMO 508 may be utilized to transmit PACs for subgroups for the same PO. As further shown in FIG. 5, the PAC PDCCH candidates for subgroups for the same PO are time division multiplexed. For instance, the PAC PDCCH candidate 510 and the PAC PDCCH candidate 512 are transmitted at a first time and the PAC PDCCH candidate 514 and PAC PDCCH candidate 516 are transmitted at a second time.

In some aspects, a subgroup ID identifying a subgroup assigned to a UE (e.g., for paging) may be mapped to a PAC PDCCH candidate index, a PAC RNTI and/or a PAC PMO. For a subgroup ID assigned to a UE, the network may determine the PMO, the PDCCH candidate, and/or the RNTI by repeatedly performing modulo and division operations. For example, the subgroup ID modulo the number of PAC PMOs may determine the PMO. That is the PMO may be equal to the subgroup ID modulo the number of PAC PMOs for subgroups for the same PO. The subgroup ID divided by the number of PAC PMOs may be used to further determine the PDCCH candidate index and/or the RNTI. That is, the subgroup ID divided by the number of PAC PMOs may be equal to the PDCCH candidate index and/or the RNTI. In some aspects, the number of subgroups indicated by the same PAC PDCCH (which may be referred to as the subgroupNumPAC) may be determined based on a combination of the total number of subgroups of the PO, the number of PAC PMOs for different PACs for the same PO, the number of PAC PDCCH candidates in each PMO, and/or the number of PAC RNTIs. For example, the number of subgroups indicated by the same PAC PDCCH may be determined by dividing the total number of subgroups of the PO by the product of the number of PAC PMOs for different PACs for the same PO, the number of PAC PDCCH candidates in each PMO, and the number of PAC RNTIs. In some aspects, a codepoint-based indication may be included in the PAC PDCCH payload of subgroups per PAC obtained above may be further rounded up to the nearest integer number by a ceiling operation or to the nearest value $2^k$, where k is a positive integer number.

In some aspects, the PAC PDCCH may include one or multiple codepoints (e.g., of a codebook), each indicating a subgroup in one of the subgroups associated with a respective codepoint of the codepoint(s) is being paged. The subgroup may include a single UE for a per-UE paging indication. The number of bits for each codepoint may be determined in accordance with Equation 1:

$$\text{Number of bits per codepoint} = \log_2 \frac{subgroupNumPAC}{numCodepoint} \quad \text{(Equation 1)}$$

where numCodepoint is equal to the number of codepoints. The number of bits per codepoint obtained above may be further rounded up to the nearest integer number by a ceiling operation.

Figure 6:
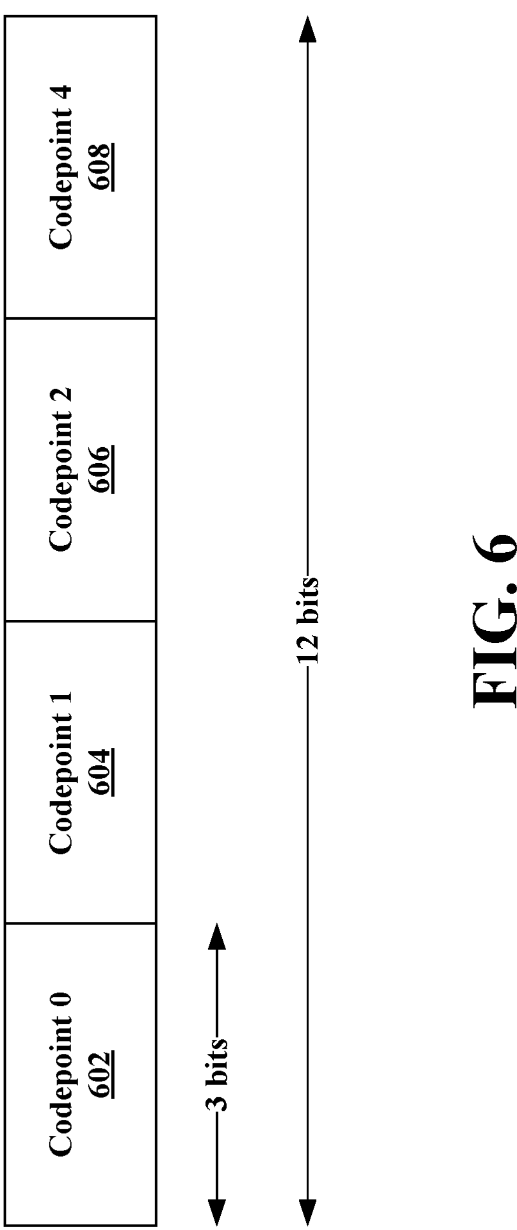
FIG. 6 depicts a diagram of a plurality of codepoints in accordance with various aspects of the present disclosure.

For example, FIG. 6 depicts a diagram 600 of a plurality of codepoints. As shown in FIG. 6, each of four codepoints 602, 604, 606, and 608 may be 3 bits. Each codepoint may indicate one of 8 subgroups using the 3 bits. Accordingly, the total number of bits to indicate the maximum number of subgroups is 12. Using the 12 bits, the maximum number of subgroups that can be indicated by the PAC may be 32 (i.e., four codepoints×8 subgroups). Using a bitmap, the maximum number of subgroups that may be indicated may be 12. A network may page at most 4 subgroups in one PAC simultaneously using a codepoint. If more than one subgroup associated with a codepoint is paged, the network may page them in PAC PMOs associated with different paging occasions, which introduces paging delay. For random paging of users, this probability is low. When using a bitmap, a network may page at most 12 subgroups in one PAC simultaneously.

In some aspects, the codepoint for a UE may be determined based on a combination of a UE subgroup ID, the number of PAC PMOs for different PACs for the same PO, the number of PAC PDCCH candidates in each PMO, the number of PAC RNTIs, and the number of codepoints (numCodepoint). For instance, the codepoint for a UE may be determined based on the UE subgroup ID modulo subgroupNumPAC (i.e., the remainder of the UE group ID divided by subgroupNumPAC). The remainder modulo the number of codepoints (numCodepoint) may be equal to the codepoint for the UE. If the remainder is divided by the number of subgroups per codepoint, the quotient (which may be rounded down to the nearest integer number based on floor operation) may also be equal to the codepoint for the UE, where the number of subgroups per codepoint is equal to subgroupNumPAC/numCodepoint.

In some aspects, to further improve the detectability of the PAC, time domain repetition of a PAC with time first repetition may be supported. For instance, the PEI beam first repetition allows for fast UE beam switching, but is not convenient for UE joint processing of repetitions of the same PDCCH. A PEI occasion may be equal to the number of PEI PMOs for the same PO. The number of PEI PMOs for the same PO may be determined based on the number of beams (e.g., configured by the network) and the number of repetitions. For instance, the number of PEI PMOs may be determined by multiplying the number of beams by the number of repetitions. The number of repetitions may be configured or defined (e.g., defined in a wireless standard, configured by the network for the UE, preconfigured in advance of being indicated, etc.), or alternatively, may be defined, controlled, and/or signaled by the network (e.g., a network node or a component of the core network)).

Figure 7A:
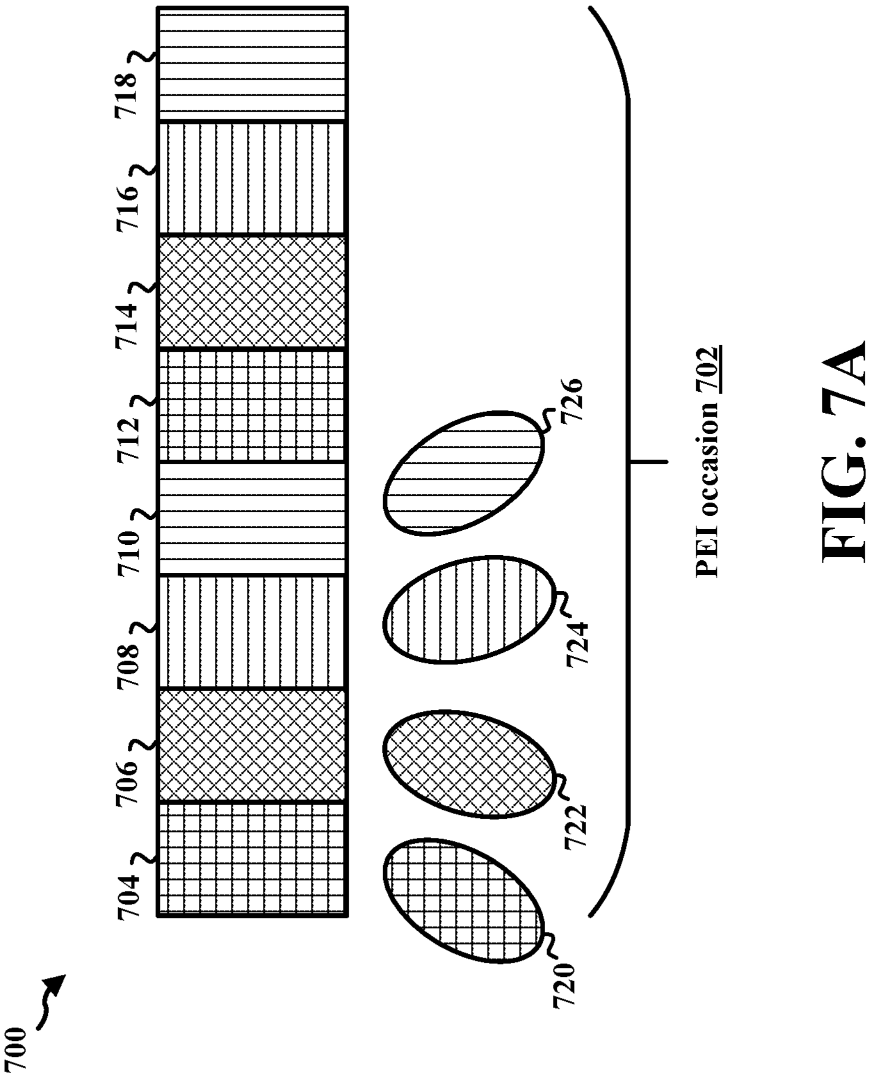
FIG. 7A depicts a diagram illustrating a paging early indication occasion in accordance with various aspects of the present disclosure.

For instance, FIG. 7A depicts a diagram 700 illustrating a PEI occasion in accordance with various aspects of the present disclosure. As shown in FIG. 7A, a PEI occasion 702 may include 8 PEI PMOs 704, 706, 708, 710, 712, 714, 716, and 718. The number of PEI PMOs (i.e., 8) may be equal to the number of beams supported (e.g., 4, as shown in FIG. 7A) multiplied by the number of times the beams are to be repeated (i.e., 2 times). A first beam 720 may be transmitted via the PEI PMO 704 and repeated via the PEI PMO 712. A second beam 722 may be transmitted via the PEI PMO 706 and repeated via the PEI PMO 714. A third beam 724 may be transmitted via the PEI PMO 708 and repeated via the PEI PMO 716. A fourth beam 726 may be transmitted via the PEI PMO 710 and repeated via the PEI PMO 718.

A PAC occasion may be equal to the number of PAC PMOs for the same PO. The number of PAC PMOs for the same PO may be determined based on the number of beams (e.g., configured by the network), the number of PMO sets, and the number of repetitions. The PMO set may be a set of PMOs where the same PAC is transmitted for the same PO. For instance, the number of PAC PMOs may be determined by multiplying the number of beams by the number of PMO sets and the number of repetitions. The number of repetitions may be configured or defined.

Figure 7B:
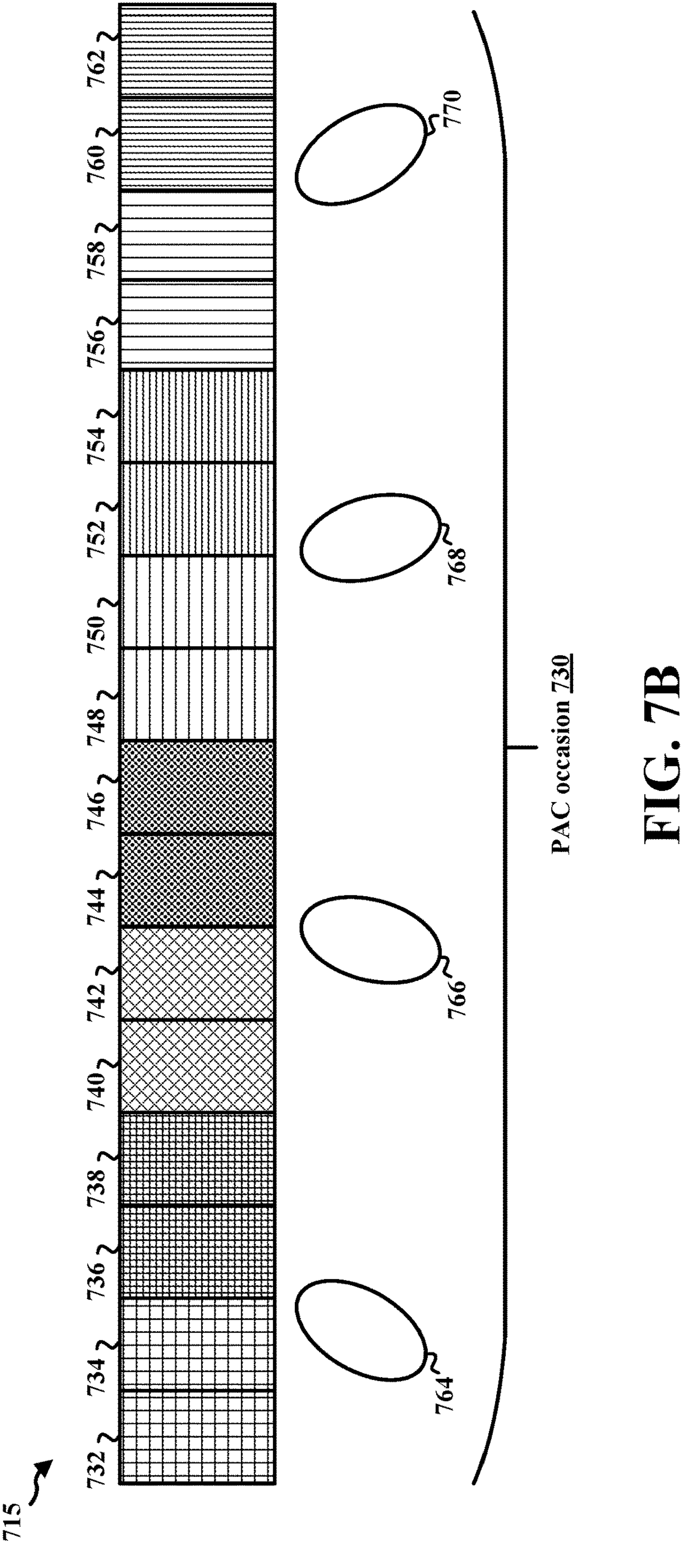
FIG. 7B depicts a diagram illustrating a paging alert channel occasion in accordance with various aspects of the present disclosure.

For instance, FIG. 7B depicts a diagram 715 illustrating a PAC occasion in accordance with various aspects of the present disclosure. As shown in FIG. 7B, a PAC occasion 730 may include 16 PEI PMOs 732, 734, 736, 738, 740, 742, 744, 746, 748, 750, 752, 754, 756, 758, 760, and 762. The PEI PMOs 732 and 734 may belong to a first PMO set for a first beam 764. The PEI PMOs 736 and 738 may belong to a second PMO set for the first beam 764. The PEI PMOs 740 and 742 may belong to a first PMO set for a second beam 766. The PEI PMOs 744 and 746 may belong to a second PMO set for the second beam 766. The PEI PMOs 748 and 750 may belong to a first PMO set for a third beam 768. The PEI PMOs 752 and 754 may belong to a second PMO set for the third beam 768. The PEI PMOs 756 and 758 may belong to a first PMO set for a fourth beam 770. The PEI PMOs 760 and 762 may belong to a second PMO set for the fourth beam 770. Accordingly, two sets of PMOs may be utilized for each of the first beam 764, the second beam 766, the third beam 768, and the fourth beam 770.

In some aspects, a PAC PDCCH may be CRC-protected. The number of CRC bits utilized for a PAC PDCCH may be less than 24 bits (e.g., 12 bits).

Figure 8:
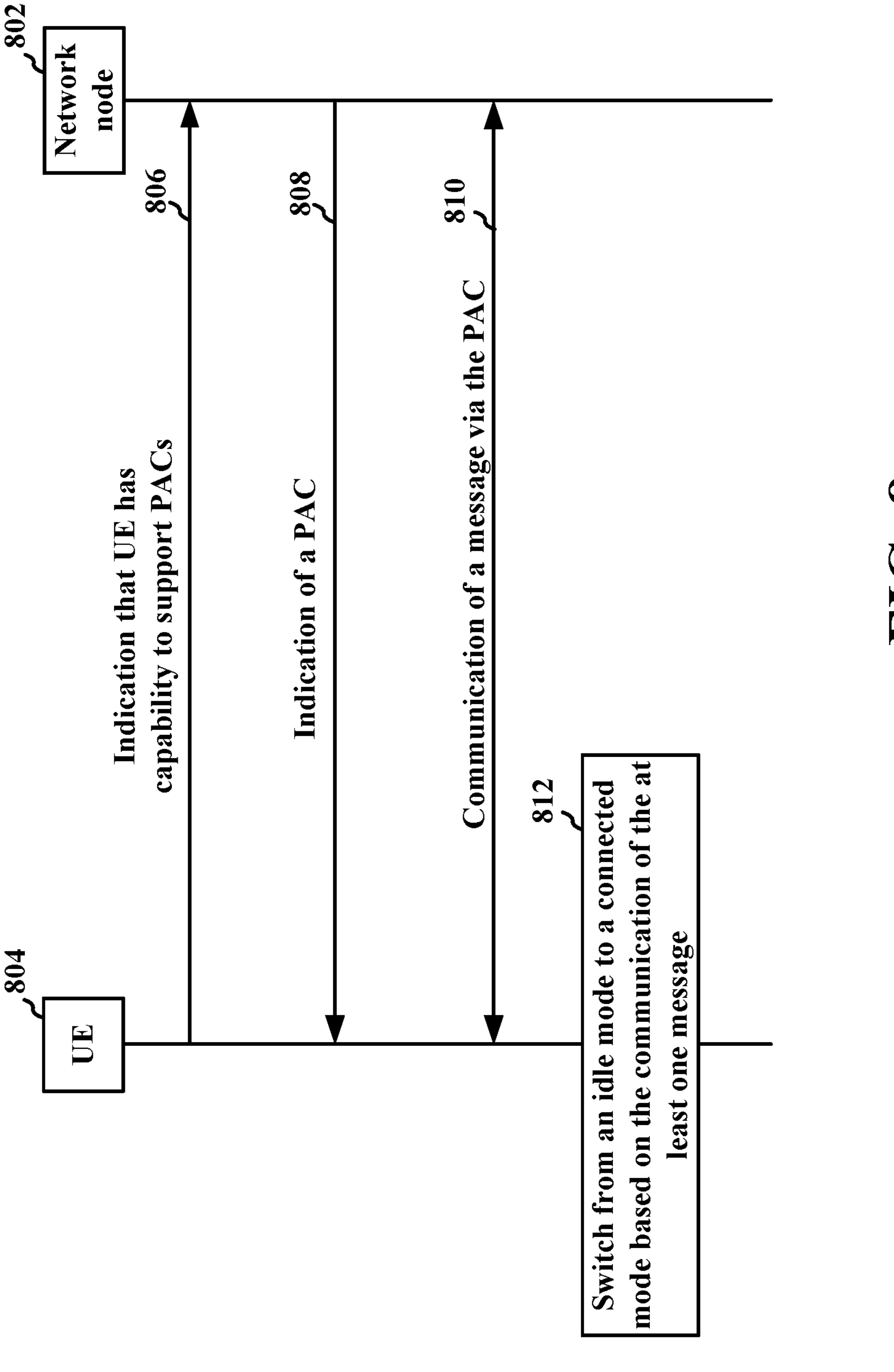
FIG. 8 is a call flow diagram illustrating a method of wireless communication, in accordance with various aspects of this present disclosure.

FIG. 8 is a call flow diagram 800 illustrating a method of wireless communication in accordance with various aspects of the present disclosure. As shown in FIG. 8, the call flow diagram 800 includes a network node 802 and a UE 804. The UE 804 may be an example of the UE 104 or the UE 350. The network node 802 may be an example of the base station 102 or the base station 310. Although aspects are described for the network node 802, the aspects may be performed by the network node 802 in aggregation and/or by one or more components of the network node 802 (e.g., such as a CU 110, a DU 130, and/or an RU 140). As shown in FIG. 8, at 806, the UE 804 may provide an indication to the network node 802 that indicates that the UE 804 supports the reception of PACs.

At 808, the UE 804 may receive, from the network node 802, an indication of a PAC, where the indication is associated with at least a subset of subgroup IDs of a plurality of UEs associated with a same paging occasion, where each of the plurality of UEs is configured to receive the indication of the PAC associated with the same paging occasion.

In some aspects, the UE 804 may receive the indication of the PAC at 808 by receiving, from the network node 802 via the PAC, the indication of the PAC. For example, referring to FIG. 5, each of a plurality of UEs may receive the indication of a PAC (e.g., the PDCCH candidate 510) included in the PMO 506 of the same paging occasion (e.g., the paging occasion 504). The indication received via the PDCCH candidate 510 may include at least a subset of subgroup IDs of the plurality of UEs (e.g., the UE 804).

In some aspects, the PAC received at 808 may include a PDCCH. For example, referring to FIG. 5, the PAC may be the PDCCH candidate 510.

In some aspects, the indication received at 808 may indicate at least one of the subgroup IDs of the plurality of UEs associated with the same paging occasion.

In some aspects, the PAC received at 808 may be associated with the subset based on a PDCCH candidate index associated with the PAC, where the PDCCH candidate index is associated with a PDCCH monitoring occasion or at least one RNTI associated with the PAC.

In some aspects, the subset of the subgroup IDs may be associated with at least one of the PDCCH candidate index a first RNTI of the at least one RNTI, or the PDCCH monitoring occasion.

In some aspects, the PAC received at 808 may include codepoint(s) that each indicate a respective subgroup ID in the subset of subgroup IDs of the plurality of UEs. In such aspects, each of the codepoint(s) included in the PAC received at 808 may be based on a subgroup ID in the subset of subgroup IDs, where the subgroup ID corresponds to at least one UE of the plurality of UEs, the number of PDCCH monitoring occasions associated with (e.g., within) the same paging occasion, the number of PDCCH candidate indexes in each PDCCH monitoring occasion of the PDCCH monitoring occasions, the number of the at least one RNTI, and the number of the codepoint(s).

In some aspects, the network node 802 may provide, and the UE 804 may receive, the indication of the PAC at 808 by receiving the indication of the PAC a plurality of times based on the number of beams configured by the network node 802, the number of PDCCH monitoring occasions associated with (e.g., within) the same paging occasion, and the number corresponding to a configured number of times the PAC is to be repeated in a beam.

In some aspects, the PAC received by the UE 804 at 808 may include a plurality of CRC bits (e.g., less than 24 bits).

At 810, the UE 804 may communicate at least one message with the network node based on the indication of the PAC. For example, in some aspects, the at least one message may include an indication of a PEI PDCCH from the network node 802 to the UE 804, an indication of a paging PDCCH from the network node 802 to the UE 804, an uplink random access message (e.g., message received via a PRACH) from the UE 804 to the network node 802, an alert (e.g., a public safety, an emergency, or threat alert) from the network node 802 to the UE 804, an indication from the network node 802 to the UE 804 to switch from an idle mode to a connected mode node, etc. In the idle mode, the UE 804 may not be known to the network node 802, but is known by the network and may communicate with the network. The UE 804 may be in the idle mode when it does not have any data to send. When in the idle mode, the UE 804 may operate in a reduced power state. In the connected mode, the UE 804 may keep its transmitter and receiver in an active state, and the UE 804 may be known to the network node 802 and the network.

In some aspects, at 812, the UE 804 may switch from an idle mode to a connected mode based on the communication of the at least one message communicated at 810.

Figure 9:
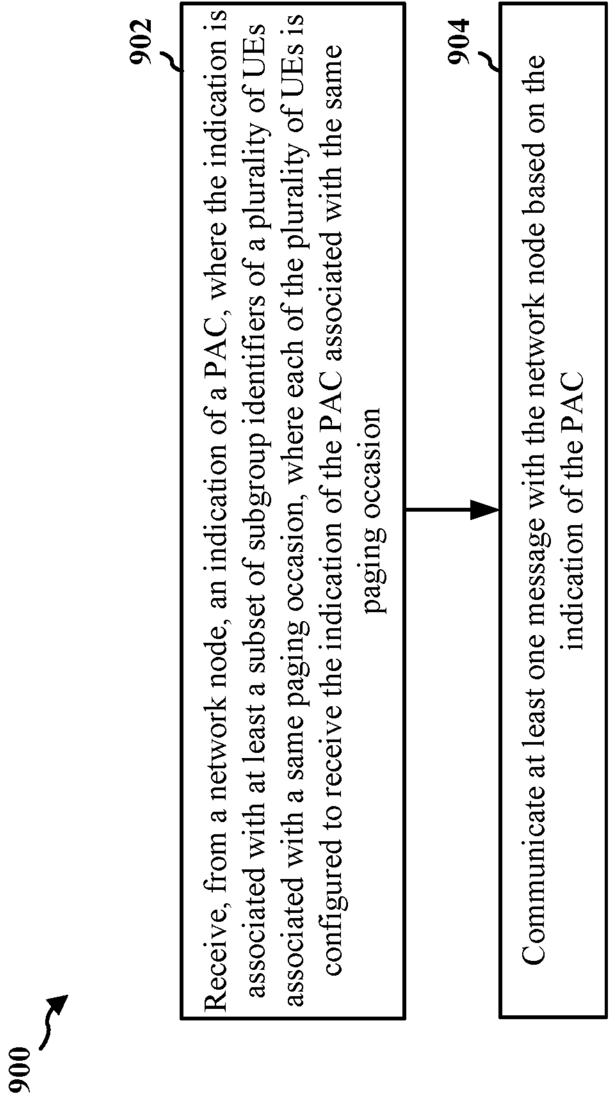
FIG. 9 is a flowchart illustrating methods of wireless communication in accordance with various aspects of the present disclosure.

FIG. 9 is a flowchart 900 illustrating methods of wireless communication at a UE in accordance with various aspects of the present disclosure. In some aspects, the UE may be the UE 104, the UE 350, or the UE 804, or the apparatus 1304 in the hardware implementation of FIG. 13.

At 902, the UE may receive an indication of a PAC, where the indication is associated with at least a subset of subgroup IDs of a plurality of UEs associated with a same paging occasion, where each of the plurality of UEs is configured to receive the indication of the PAC associated with the same paging occasion. For example, referring to FIG. 8, the UE 804 may receive, from the network node 802, an indication of a PAC, where the indication is associated with at least a subset of subgroup IDs of a plurality of UEs associated with a same paging occasion, where each of the plurality of UEs is configured to receive the indication of the PAC associated with the same paging occasion. In an aspect, 902 may be performed by the PAC component 198.

In some aspects, the UE may receive the indication of the PAC by receiving, from the network node via the PAC, the indication of the PAC. For example, referring to FIG. 8, the UE 804 may receive the indication of the PAC at 808 by receiving, from the network node 802 via the PAC, the indication of the PAC. For example, referring to FIG. 5, each of a plurality of UEs may receive the indication of a PAC (e.g., the PDCCH candidate 510) included in the PMO 506 of the same paging occasion (e.g., the paging occasion 504). The indication received via the PDCCH candidate 510 may include at least a subset of subgroup IDs of the plurality of UEs (e.g., the UE 804).

In some aspects, the PAC may include a PDCCH. For example, referring to FIG. 8, the PAC received at 808 may include a PDCCH. For example, referring to FIG. 5, the PAC may be the PDCCH candidate 510.

In some aspects, the indication may indicate at least one of the subgroup IDs of the plurality of UEs associated with the same paging occasion. For example, referring to FIG. 8, the indication received at 808 may indicate at least one of the subgroup IDs of the plurality of UEs associated with the same paging occasion.

In some aspects, the PAC may be associated with the subset based on at least one of a PDCCH candidate index associated with the PAC, where the PDCCH candidate index is associated with a PDCCH monitoring occasion or at least one RNTI associated with the PAC. For example, referring to FIG. 8, the PAC received at 808 may be associated with the subset based on at least one of a PDCCH candidate index associated with the PAC, where the PDCCH candidate index is associated with a PDCCH monitoring occasion or at least one RNTI associated with the PAC.

In some aspects, the subset of the subgroup IDs may be associated with at least one of the PDCCH candidate index, a first RNTI of the at least one RNTI, or the PDCCH monitoring occasion. For example, referring to FIG. 8, the subset of the subgroup IDs indicated by the PAC at 808 may be associated with at least one of the first PDCCH candidate index, a first RNTI of the at least one RNTI, or the first PDCCH monitoring occasion.

In some aspects, the PAC includes codepoint(s) that each indicate a respective subgroup ID in the subset of subgroup IDs of the plurality of UEs. For example, referring to FIG. 8, the PAC received at 808 may include codepoint(s) that each indicate a respective subgroup ID in the subset of subgroup IDs of the plurality of UEs.

In some aspects, each of the codepoint(s) may be based on a subgroup ID in the subset of subgroup IDs, where the subgroup ID corresponds to at least one UE of the plurality of UEs, a first number of PDCCH monitoring occasions associated with the same paging occasion, a second number of PDCCH candidate indexes in each PDCCH monitoring occasion of the PDCCH monitoring occasions, a third number of the at least one RNTI, and a fourth number of the one or more codepoints. For example, referring to FIG. 8, each of the codepoint(s) included in the PAC received at 808 may be based on a subgroup ID in the subset of subgroup IDs, where the subgroup ID corresponds to at least one UE of the plurality of UEs, the number of PDCCH monitoring occasions associated with the same paging occasion, the number of PDCCH candidate indexes in each PDCCH monitoring occasion of the PDCCH monitoring occasions, the number of the at least one RNTI, and the number of the codepoint(s).

In some aspects, the UE may receive, from the network node, the indication of the PAC by receiving the indication of the PAC a plurality of times based on a first number of beams configured by the network node, a second number of PDCCH monitoring occasions associated with the same paging occasion, and a third number corresponding to a configured number of times the PAC is to be repeated in a beam. For example, referring to FIG. 8, the UE 804 may receive the indication of the PAC at 808 by receiving the indication of the PAC a plurality of times based on the number of beams configured by the network node 802, the number of PDCCH monitoring occasions associated with the same paging occasion, and the number corresponding to a configured number of times the PAC is to be repeated in a beam.

In some aspects, the PAC may include a plurality of CRC bits. For example, referring to FIG. 8, the PAC received by the UE 804 at 808 may include a plurality of CRC bits (e.g., less than 24 bits).

At 904, the UE may communicate at least one message with the network node based on the indication of the PAC. For example, referring to FIG. 8, at 810, the UE 804 may communicate at least one message with the network node based on the indication of the PAC. In an aspect, 904 may be performed by the PAC component 198.

In some aspects, the at least one message includes at least one of a PEI PDCCH, a paging PDCCH, an uplink random access message, or an alert. For example, referring to FIG. 8, the message communicated at 810 may include an indication of a PEI PDCCH from the network node 802 to the UE 804, an indication of a paging PDCCH from the network node 802 to the UE 804, an uplink random access message (e.g., message received via a PRACH) from the UE 804 to the network node 802, an alert (e.g., a public safety, an emergency, or threat alert) from the network node 802 to the UE 804, an indication from the network node 802 to the UE 804 to switch from an idle mode to a connected mode, etc.

In some aspects, the UE may switch from an idle mode to a connected mode based on the communication of the at least one message. For example, referring to FIG. 8, at 812, the UE 804 may switch from an idle mode to a connected mode based on the communication of the at least one message communicated at 810.

Figure 10:
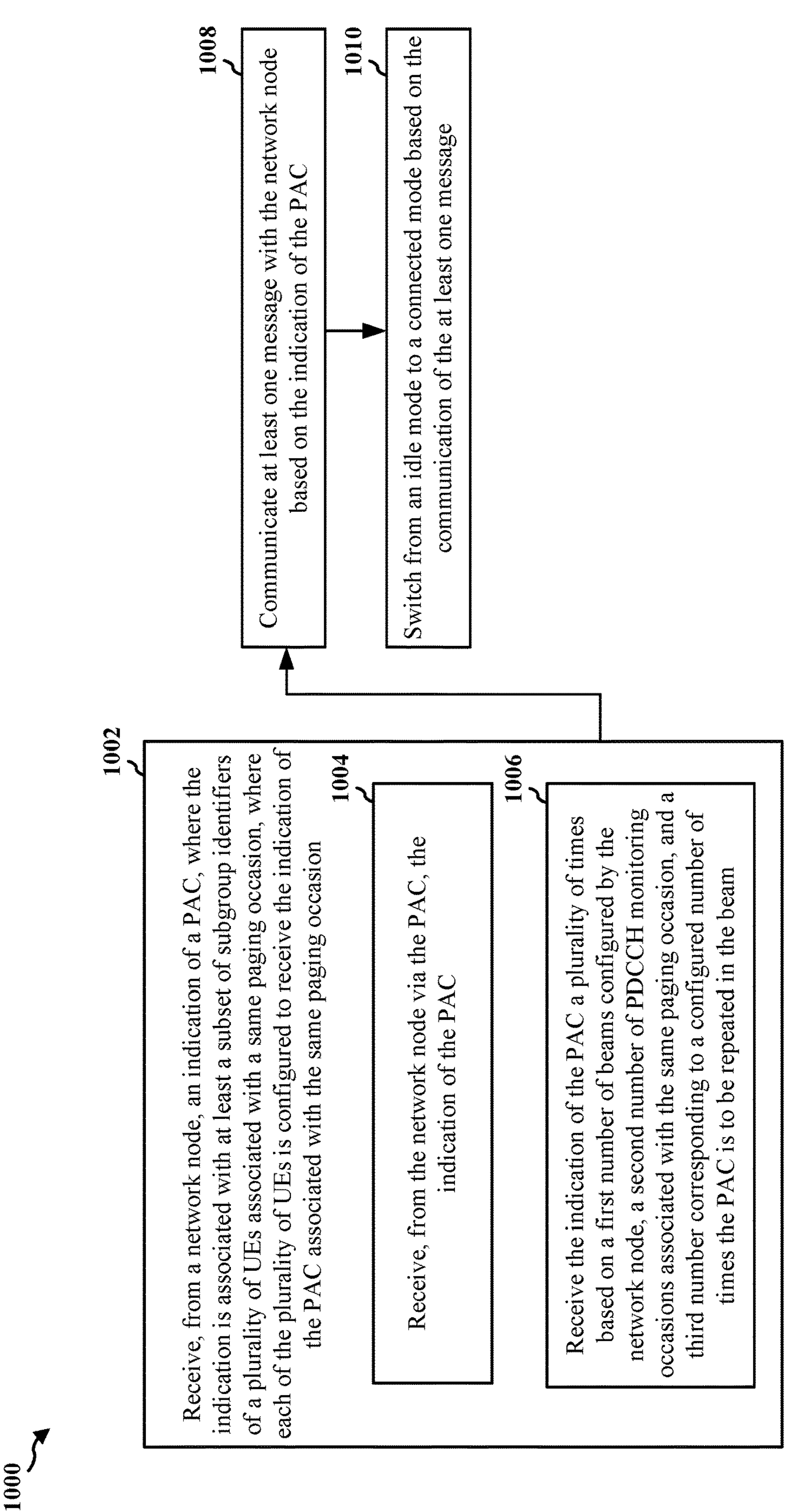
FIG. 10 is a flowchart illustrating methods of wireless communication in accordance with various aspects of the present disclosure.

FIG. 10 is a flowchart 1000 illustrating methods of wireless communication at a UE in accordance with various aspects of the present disclosure. In some aspects, the UE may be the UE 104, the 350, or the UE 804, or the apparatus 1304 in the hardware implementation of FIG. 13.

At 1002, the UE may receive an indication of a PAC, where the indication is associated with at least a subset of subgroup IDs of a plurality of UEs associated with a same paging occasion, where each of the plurality of UEs is configured to receive the indication of the PAC associated with the same paging occasion. For example, referring to FIG. 8, the UE 804 may receive, from the network node 802, an indication of a PAC, where the indication is associated with at least a subset of subgroup IDs of a plurality of UEs associated with a same paging occasion, where each of the plurality of UEs is configured to receive the indication of the PAC associated with the same paging occasion. In an aspect, 1002 may be performed by the PAC component 198.

In some aspects, as part of 1002, at 1004, the UE may receive the indication of the PAC by receiving, from the network node via the PAC, the indication of the PAC. For example, referring to FIG. 8, the UE 804 may receive the indication of the PAC at 808 by receiving, from the network node 802 via the PAC, the indication of the PAC. For example, referring to FIG. 5, each of a plurality of UEs may receive the indication of a PAC (e.g., the PDCCH candidate 510) included in the PMO 506 of the same paging occasion (e.g., the paging occasion 504). The indication received via the PDCCH candidate 510 may include at least a subset of subgroup IDs of the plurality of UEs (e.g., the UE 804). In an aspect, 1004 may be performed by the PAC component 198.

In some aspects, the PAC may include a PDCCH. For example, referring to FIG. 8, the PAC received at 808 may include a PDCCH. For example, referring to FIG. 5, the PAC may be the PDCCH candidate 510.

In some aspects, the indication may indicate at least one of the subgroup IDs of the plurality of UEs associated with the same paging occasion. For example, referring to FIG. 8, the indication received at 808 may indicate at least one of the subgroup IDs of the plurality of UEs associated with the same paging occasion.

In some aspects, as part of 1002, at 1006, the UE may receive, from the network node, the indication of the PAC by receiving the indication of the PAC a plurality of times based on a first number of beams configured by the network node, a second number of PDCCH monitoring occasions associated with the same paging occasion, and a third number corresponding to a configured number of times the PAC is to be repeated in a beam. For example, referring to FIG. 8, the UE 804 may receive the indication of the PAC at 808 by receiving the indication of the PAC a plurality of times based on the number of beams configured by the network node 802, the number of PDCCH monitoring occasions associated with the same paging occasion, and the number corresponding to a configured number of times the PAC is to be repeated in a beam. In an aspect, 1006 may be performed by the PAC component 198.

In some aspects, the PAC may include a plurality of CRC bits. For example, referring to FIG. 8, the PAC received by the UE 804 at 808 may include a plurality of CRC bits (e.g., less than 24 bits).

In some aspects, the PAC may be associated with the subset based on at least one of a PDCCH candidate index associated with the PAC, where the PDCCH candidate index is associated with a PDCCH monitoring occasion or at least one RNTI associated with the PAC. For example, referring to FIG. 8, the PAC received at 808 may be associated with the subset based on at least one of a PDCCH candidate index associated with the PAC, where the PDCCH candidate index is associated with a PDCCH monitoring occasion or at least one RNTI associated with the PAC.

In some aspects, the subset of the subgroup IDs may be associated with at least one of the PDCCH candidate index, a first RNTI of the at least one RNTI, or the PDCCH monitoring occasion. For example, referring to FIG. 8, the subset of the subgroup IDs indicated by the PAC at 808 may be associated with at least one of the first PDCCH candidate index, a first RNTI of the at least one RNTI, or the first PDCCH monitoring occasion.

In some aspects, the PAC includes codepoint(s) that each indicate a respective subgroup ID in the subset of subgroup IDs of the plurality of UEs. For example, referring to FIG. 8, the PAC received at 808 may include codepoint(s) that each indicate a respective subgroup ID in the subset of subgroup IDs of the plurality of UEs.

In some aspects, each of the codepoint(s) may be based on a subgroup ID in the subset of subgroup IDs, where the subgroup ID corresponds to at least one UE of the plurality of UEs, a first number of PDCCH monitoring occasions associated with the same paging occasion, a second number of PDCCH candidate indexes in each PDCCH monitoring occasion of the PDCCH monitoring occasions, a third number of the at least one RNTI, and a fourth number of the one or more codepoints. For example, referring to FIG. 8, each of the codepoint(s) included in the PAC received at 808 may be based on a subgroup ID in the subset of subgroup IDs, where the subgroup ID corresponds to a respective UE of the plurality of UEs, the number of PDCCH monitoring occasions within the same paging occasion, the number of PDCCH candidate indexes in each PDCCH monitoring occasion of the PDCCH monitoring occasions, the number of the at least one RNTI, and the number of the codepoint(s).

At 1008, the UE may communicate at least one message with the network node based on the indication of the PAC. For example, referring to FIG. 8, at 810, the UE 804 may communicate at least one message with the network node based on the indication of the PAC. In an aspect. 1008 may be performed by the PAC component 198.

In some aspects, the at least one message includes at least one of a PEI PDCCH, a paging PDCCH, an uplink random access message, or an alert. For example, referring to FIG. 8, the message communicated at 810 may include an indication of a PEI PDCCH from the network node 802 to the UE 804, an indication of a paging PDCCH from the network node 802 to the UE 804, an uplink random access message (e.g., message received via a PRACH) from the UE 804 to the network node 802, an alert (e.g., a public safety, an emergency, or threat alert) from the network node 802 to the UE 804, an indication from the network node 802 to the UE 804 to switch from an idle mode to a connected mode, etc.

At 1010, the UE may switch from an idle mode to a connected mode based on the communication of the at least one message. For example, referring to FIG. 8, at 812, the UE 804 may switch from an idle mode to a connected mode based on the communication of the at least one message communicated at 810. In an aspect, 1010 may be performed by the PAC component 198.

Figure 11:
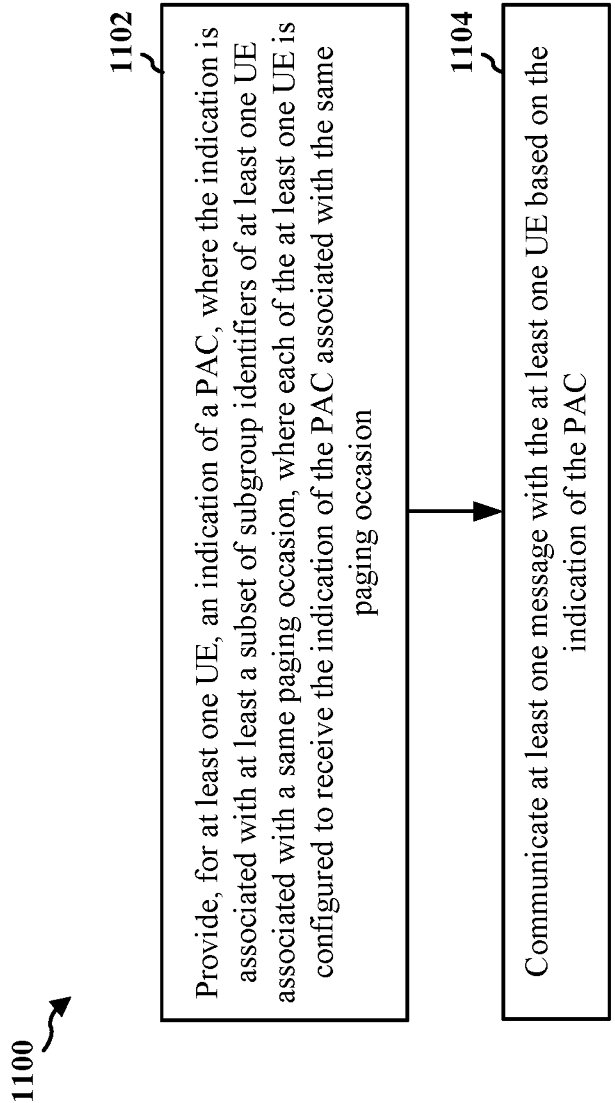
FIG. 11 is a flowchart illustrating methods of wireless communication in accordance with various aspects of the present disclosure.

FIG. 11 is a flowchart 1100 illustrating methods of wireless communication at a network node in accordance with various aspects of the present disclosure. In some aspects, the network node may be the base station 102, the base station 310, the network node 802, or the network entity 1402 in the hardware implementation of FIG. 14.

At 1102, the network node may provide, for at least one UE, an indication of a PAC, where the indication is associated with at least a subset of subgroup IDs of at least one UE associated with a same paging occasion, where each of the at least one UE is configured to receive the indication of the PAC associated with the same paging occasion. For example, referring to FIG. 8, the network node 802 may provide, for the UE 804, an indication of a PAC, where the indication is associated with at least a subset of subgroup IDs of at least one UE (e.g., the UE 804) associated with a same paging occasion, where the UE 804 is configured to receive the indication of the PAC associated with the same paging occasion. In an aspect, 1102 may be performed by the PAC component 199.

In some aspects, the network node may provide the indication of the PAC by providing, for the at least one UE via the PAC, the indication of the PAC. For example, referring to FIG. 8, the network node 802 may provide the indication of the PAC at 808 by providing, for the UE 804 via the PAC, the indication of the PAC. For example, referring to FIG. 5, each of a plurality of UEs may receive, from a network node, the indication of a PAC (e.g., the PDCCH candidate 510) included in the PMO 506 of the same paging occasion (e.g., the paging occasion 504). The indication received via the PDCCH candidate 510 may include at least a subset of subgroup IDs of the at least one UE (e.g., the UE 804).

In some aspects, the PAC may include a PDCCH. For example, referring to FIG. 8, the PAC received at 808 may include a PDCCH. For example, referring to FIG. 5, the PAC may be the PDCCH candidate 510.

In some aspects, the indication indicates at least one of the subgroup IDs of the at least one UE associated with the same paging occasion. For example, referring to FIG. 8, the indication provided at 808 may indicate at least one of the subgroup IDs of the at least one UE (e.g., the UE 804) associated with the same paging occasion.

In some aspects, the PAC may be associated with the subset based on at least one of a PDCCH candidate index associated with the PAC, where the PDCCH candidate index is associated with a PDCCH monitoring occasion or at least one RNTI associated with the PAC. For example, referring to FIG. 8, the PAC indicated at 808 may be associated with the subset based on at least one of a PDCCH candidate index associated with the PAC, where the PDCCH candidate index is associated with a PDCCH monitoring occasion or at least one RNTI associated with the PAC.

In some aspects, the subset of the subgroup IDs may be associated with at least one of the PDCCH candidate index, a first RNTI of the at least one RNTI, or the first PDCCH monitoring occasion. For example, referring to FIG. 8, the subset of the subgroup IDs indicated by the PAC at 808 may be associated with at least one of the PDCCH candidate index, a first RNTI of the at least one RNTI, or the first PDCCH monitoring occasion.

In some aspects, the PAC may include codepoint(s) that each indicate a respective subgroup ID in the subset of subgroup IDs of the at least one UE. For example, referring to FIG. 8, the PAC received at 808 may include codepoint(s) that each indicate a respective subgroup ID in the subset of subgroup IDs of the UE 804.

In some aspects, each of the codepoint(s) may be based on a subgroup ID in the subset of subgroup IDs, where the subgroup ID corresponds to one or more UEs of the at least one UE, a first number of PDCCH monitoring occasions associated with the same paging occasion, a second number of PDCCH candidate indexes in each PDCCH monitoring occasion of the PDCCH monitoring occasions, a third number of the at least one RNTI, and a fourth number of the one or more codepoints. For example, referring to FIG. 8, each of the codepoint(s) included in the PAC received at 808 may be based on a subgroup ID in the subset of subgroup IDs, where the subgroup ID corresponds to one or more UEs of the at least one UE, the number of PDCCH monitoring occasions associated with the same paging occasion, the number of PDCCH candidate indexes in each PDCCH monitoring occasion of the PDCCH monitoring occasions, the number of the at least one RNTI, and the number of the codepoint(s).

In some aspects, the network node may provide, for the at least one UE, the indication of the PAC by providing the indication of the PAC a plurality of times based on a first number of beams configured by the network node, a second number of PDCCH monitoring occasions associated with the same paging occasion, and a third number corresponding to a configured number of times the PAC is to be repeated in a beam. For example, referring to FIG. 8, the UE 804 may receive, from the network node 802, the indication of the PAC at 808 by receiving the indication of the PAC a plurality of times based on the number of beams configured by the network node 802, the number of PDCCH monitoring occasions associated with the same paging occasion, and the number corresponding to a configured number of times the PAC is to be repeated in a beam.

In some aspects, the PAC may include a plurality of CRC bits. For example, referring to FIG. 8, the PAC received by the UE 804 from the network node 802 at 808 may include a plurality of CRC bits (e.g., less than 24 bits).

At 1104, the network node may communicate at least one message with the at least one UE based on the indication of the PAC. For example, referring to FIG. 8, at 810, the network node 802 may communicate at least one message with the UE 804 based on the indication of the PAC. In an aspect, 1104 may be performed by the PAC component 199.

In some aspects, the at least one message includes at least one of a PEI PDCCH, a paging PDCCH, an uplink random access message, or an alert. For example, referring to FIG. 8, the message communicated at 810 may include an indication of a PEI PDCCH from the network node 802 to the UE 804, an indication of a paging PDCCH from the network node 802 to the UE 804, an uplink random access message (e.g., message received via a PRACH) from the UE 804 to the network node 802, an alert (e.g., a public safety, an emergency, or threat alert) from the network node 802 to the UE 804, an indication from the network node 802 to the UE 804 to switch from an idle mode to a connected mode, etc.

In some aspects, the at least one message may be configured to cause the at least one UE to switch from an idle mode to a connected mode. For example, referring to FIG. 8, at 812, the UE 804 may switch from an idle mode to a connected mode based on the communication of the at least one message communicated at 810.

Figure 12:
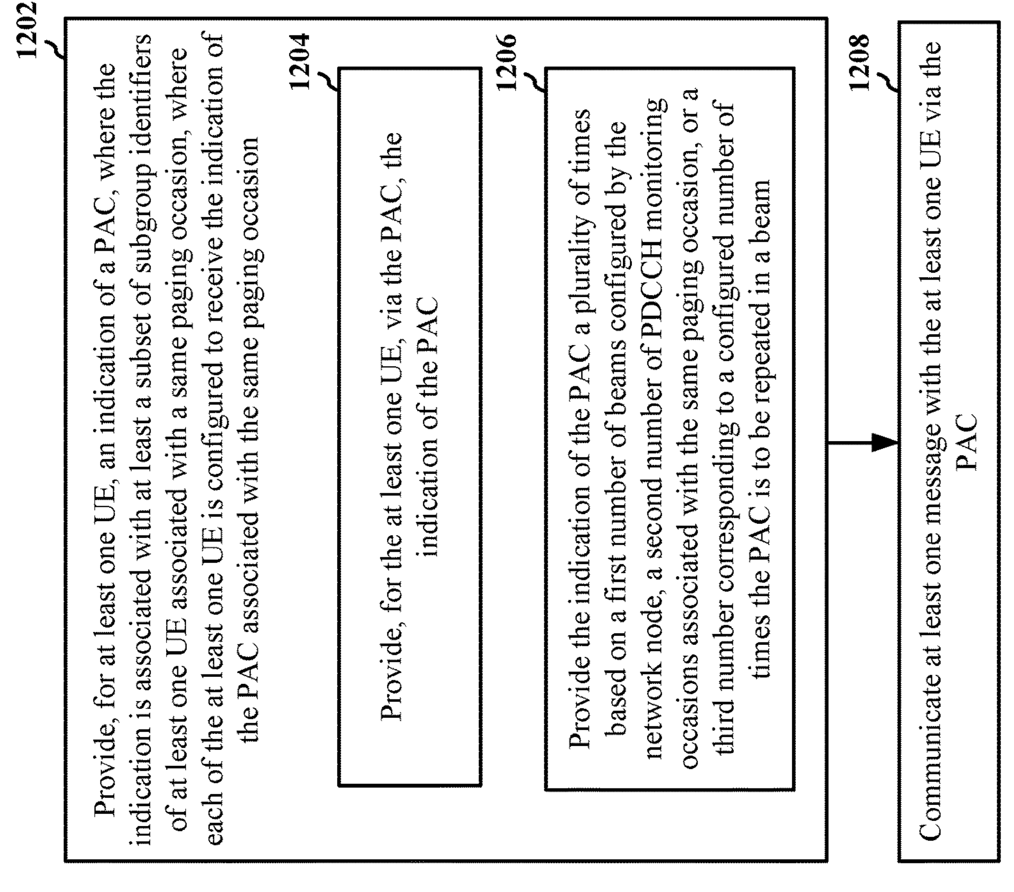
FIG. 12 is a flowchart illustrating methods of wireless communication in accordance with various aspects of the present disclosure.

FIG. 12 is a flowchart 1200 illustrating methods of wireless communication at a network node in accordance with various aspects of the present disclosure. In some aspects, the network node may be the base station 102, the base station 310, the network node 802, or the network entity 1402 in the hardware implementation of FIG. 14.

At 1202, the network node may provide, for at least one UE, an indication of a PAC, where the indication is associated with at least a subset of subgroup IDs of at least one UE associated with a same paging occasion, where each of the at least one UE is configured to receive the indication of the PAC associated with the same paging occasion. For example, referring to FIG. 8, the network node 802 may provide, for the UE 804, an indication of a PAC, where the indication is associated with at least a subset of subgroup IDs of at least one UE (e.g., the UE 804) associated with a same paging occasion, where the UE 804 is configured to receive the indication of the PAC associated with the same paging occasion. In an aspect, 1202 may be performed by the PAC component 199.

In some aspects, as part of 1202, at 1204, the network node may provide the indication of the PAC by providing, for the at least one UE via the PAC, the indication of the PAC. For example, referring to FIG. 8, the network node 802 may provide the indication of the PAC at 808 by providing, for the UE 804 via the PAC, the indication of the PAC. For example, referring to FIG. 5, each of a plurality of UEs may receive, from a network node, the indication of a PAC (e.g., the PDCCH candidate 510) included in the PMO 506 of the same paging occasion (e.g., the paging occasion 504). The indication received via the PDCCH candidate 510 may include at least a subset of subgroup IDs of the at least one UE (e.g., the UE 804). In an aspect, 1204 may be performed by the PAC component 199.

In some aspects, the PAC may include a PDCCH. For example, referring to FIG. 8, the PAC received at 808 may include a PDCCH. For example, referring to FIG. 5, the PAC may be the PDCCH candidate 510.

In some aspects, the indication indicates at least one of the subgroup IDs of the at least one UE associated with the same paging occasion. For example, referring to FIG. 8, the indication provided at 808 may indicate at least one of the subgroup IDs of the at least one UE (e.g., the UE 804) associated with the same paging occasion.

In some aspects, the PAC may be associated with the subset based on at least one of a PDCCH candidate index associated with the PAC, where the PDCCH candidate index is associated with a PDCCH monitoring occasion or at least one RNTI associated with the PAC. For example, referring to FIG. 8, the PAC indicated at 808 may be associated with the subset based on at least one of a PDCCH candidate index associated with the PAC, where the PDCCH candidate index is associated with a PDCCH monitoring occasion or at least one RNTI associated with the PAC.

In some aspects, the subset of the subgroup IDs may be associated with at least one of the PDCCH candidate index, a first RNTI of the at least one RNTI, or the first PDCCH monitoring occasion. For example, referring to FIG. 8, the subset of the subgroup IDs indicated by the PAC at 808 may be associated with at least one of the PDCCH candidate index, a first RNTI of the at least one RNTI, or the first PDCCH monitoring occasion.

In some aspects, the PAC may include codepoint(s) that each indicate a respective subgroup ID in the subset of subgroup IDs of the at least one UE. For example, referring to FIG. 8, the PAC received at 808 may include codepoint(s) that each indicate a respective subgroup ID in the subset of subgroup IDs of the UE 804.

In some aspects, each of the codepoint(s) may be based on a subgroup ID in the subset of subgroup IDs, where the subgroup ID corresponds to one or more UEs of the at least one UE, a first number of PDCCH monitoring occasions associated with the same paging occasion, a second number of PDCCH candidate indexes in each PDCCH monitoring occasion of the PDCCH monitoring occasions, a third number of the at least one RNTI, and a fourth number of the one or more codepoints. For example, referring to FIG. 8, each of the codepoint(s) included in the PAC received at 808 may be based on a subgroup ID in the subset of subgroup IDs, where the subgroup ID corresponds to one or more UEs of the at least one UE, the number of PDCCH monitoring occasions associated with the same paging occasion, the number of PDCCH candidate indexes in each PDCCH monitoring occasion of the PDCCH monitoring occasions, the number of the at least one RNTI, and the number of the codepoint(s).

In some aspects, as part of 1202, at 1206, the network node may provide, for the at least one UE, the indication of the PAC by providing the indication of the PAC a plurality of times based on a first number of beams configured by the network node, a second number of PDCCH monitoring occasions associated with the same paging occasion, and a third number corresponding to a configured number of times the PAC is to be repeated in a beam. For example, referring to FIG. 8, the UE 804 may receive, from the network node 802, the indication of the PAC at 808 by receiving the indication of the PAC a plurality of times based on the number of beams configured by the network node 802, the number of PDCCH monitoring occasions associated with the same paging occasion, and the number corresponding to a configured number of times the PAC is to be repeated in a beam. In an aspect, 1206 may be performed by the PAC component 199.

In some aspects, the PAC may include a plurality of CRC bits. For example, referring to FIG. 8, the PAC received by the UE 804 from the network node 802 at 808 may include a plurality of CRC bits (e.g., less than 24 bits).

At 1208, the network node may communicate at least one message with the at least one UE based on the indication of the PAC. For example, referring to FIG. 8, at 810, the network node 802 may communicate at least one message with the UE 804 based on the indication of the PAC. In an aspect, 1212 may be performed by the PAC component 199.

In some aspects, the at least one message includes at least one of a PEI PDCCH, a paging PDCCH, an uplink random access message, or an alert. For example, referring to FIG. 8, the message communicated at 810 may include an indication of a PEI PDCCH from the network node 802 to the UE 804, an indication of a paging PDCCH from the network node 802 to the UE 804, an uplink random access message (e.g., message received via a PRACH) from the UE 804 to the network node 802, an alert (e.g., a public safety, an emergency, or threat alert) from the network node 802 to the UE 804, an indication from the network node 802 to the UE 804 to switch from an idle mode to a connected mode, etc.

In some aspects, the at least one message may be configured to cause the at least one UE to switch from an idle mode to a connected mode. For example, referring to FIG. 8, at 812, the UE 804 may switch from an idle mode to a connected mode based on the communication of the at least one message communicated at 810.

Figure 13:
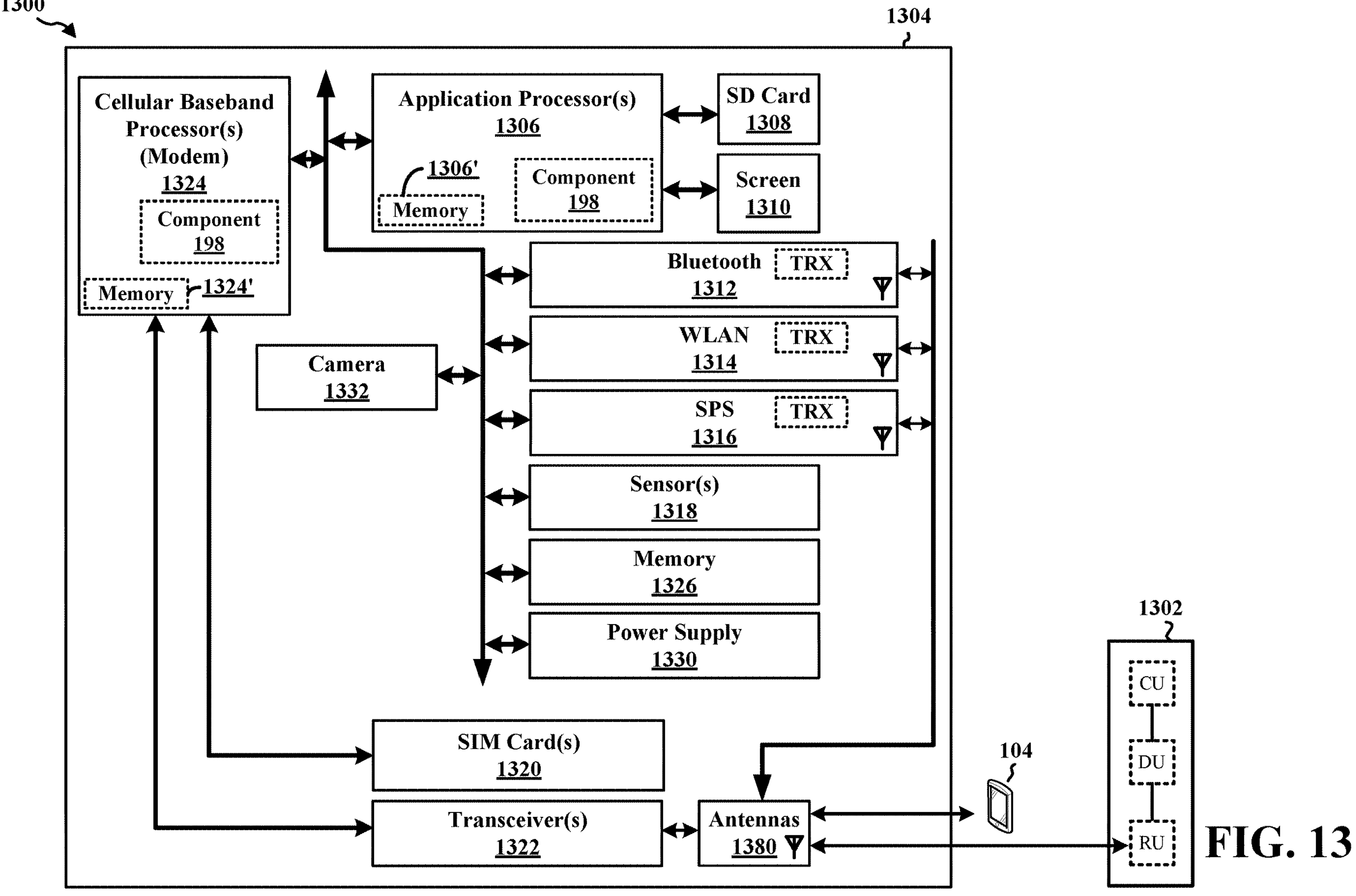
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor (s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to receive, from a network node, an indication of a PAC, where the indication is associated with at least a subset of subgroup IDs of a plurality of UEs associated with a same paging occasion, where each of the plurality of UEs is configured to receive the indication of the PAC associated with the same paging occasion, and to communicate at least one message with the network node based on the indication of the PAC. The component 198 may be configured to perform any of the aspects described in connection with the flowcharts in FIGS. 9 and 10, and/or the aspects performed by the UE 804 in the communication flow in FIG. 8. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for receiving, from a network node, an indication of a PAC, where the indication is associated with at least a subset of subgroup IDs of a plurality of UEs associated with a same paging occasion, where each of the plurality of UEs is configured to receive the indication of the PAC associated with the same paging occasion, and means for communicating at least one message with the network node based on the indication of the PAC. The apparatus may further include means for performing any of the aspects described in connection with the flowcharts in FIGS. 9 and 10, and/or the aspects performed by the UE 804 in the communication flow in FIG. 8. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
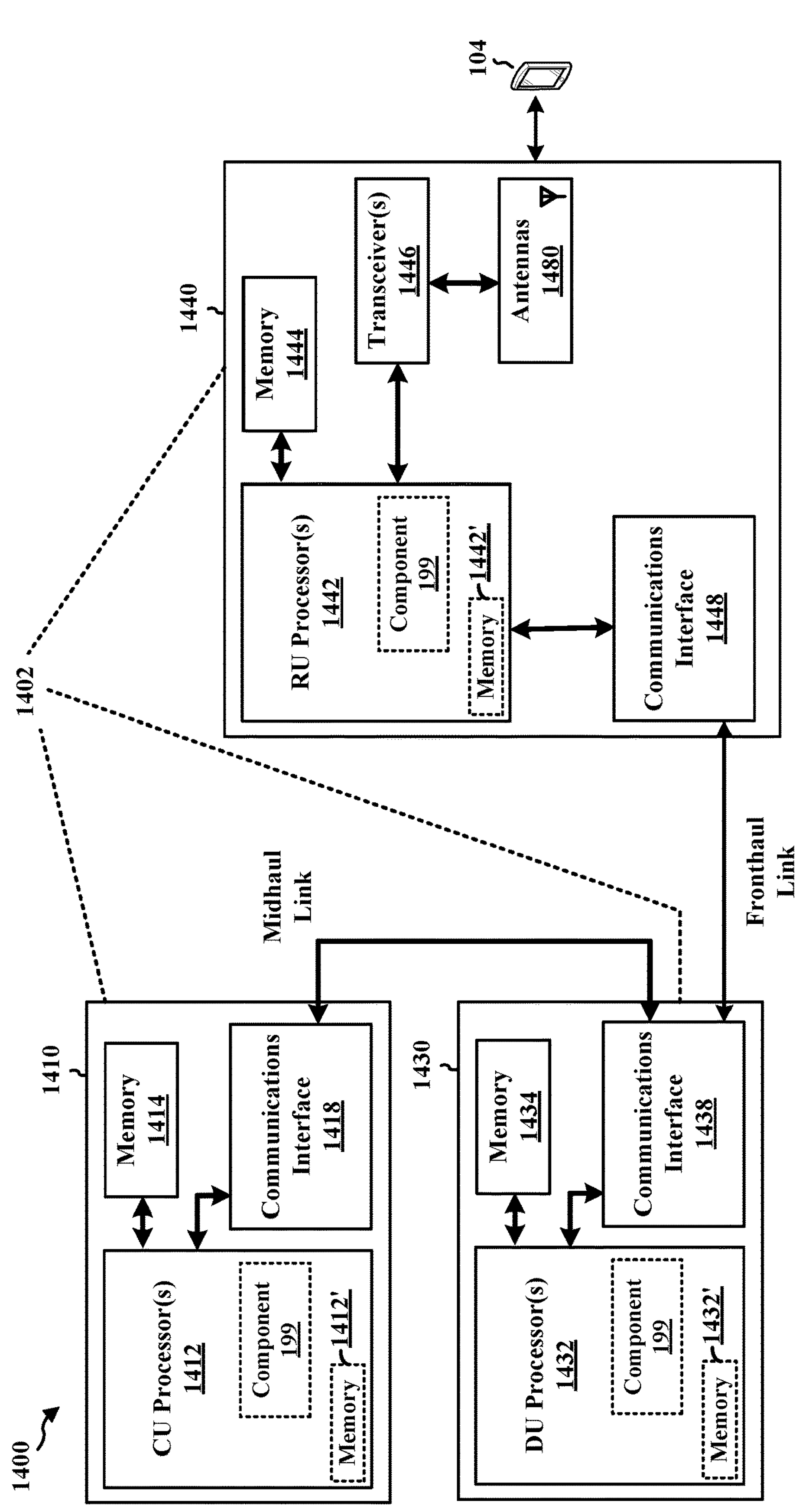
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include at least one CU processor 1412. The CU processor(s) 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include at least one DU processor 1432. The DU processor(s) 1432 may include on-chip memory 1432'. In some aspects, the DU 1430 may further include additional memory modules 1434 and a communications interface 1438. The DU 1430 communicates with the RU 1440 through a fronthaul link. The RU 1440 may include at least one RU processor 1442. The RU processor(s) 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to provide, for at least one UE, an indication of a PAC, where the indication is associated with at least a subset of subgroup IDs of at least one UE associated with a same paging occasion, where each of the at least one UE is configured to receive the indication of the PAC associated with the same paging occasion, and to communicate at least one message with the at least one UE based on the indication of the PAC. The component 199 may be configured to perform any of the aspects described in connection with the flowcharts in FIGS. 11 and 12, and/or the aspects performed by the network node 802 in the communication flow in FIG. 8. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1402 may include a variety of components configured for various functions. In one configuration, the network entity 1402 may include means for providing, for at least one UE, an indication of a PAC, where the indication is associated with at least a subset of subgroup IDs of at least one UE associated with a same paging occasion, where each of the at least one UE is configured to receive the indication of the PAC associated with the same paging occasion, and means for communicating at least one message with the at least one UE based on the indication of the PAC. The apparatus may further include means for performing any of the aspects described in connection with the flowcharts in FIGS. 11 and 12, and/or the aspects performed by the network node 802 in the communication flow in FIG. 8. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Various aspects of the present disclosure, in connection with the accompanying drawings, relate generally to communication systems. Some aspects more specifically relate to a paging alert channel (PAC) for providing paging messages to a UE. For instance, a UE may receive, from a network node, an indication of a PAC. The indication may be associated with at least a subset of subgroup identifiers of at least one UE associated with a same paging occasion. Each UE may be configured to receive the indication of the PAC associated with the same paging occasion. The UE and network node may communicate at least one message based on the indication of the PAC. In some aspects, the PAC may have a relatively small size so that the probability of a missed detection is low, may be encoded and protected by cyclic redundancy checking, thereby providing a relatively low false alarm probability so that false human intervention may not be frequently specified, and may provide a per-user indication.

Particular aspects of the subject matter described in this disclosure can be implemented to realize one or more of the following potential advantages. In some examples, by providing a relatively small size PAC and protecting the PAC via cyclic redundancy checking, the likelihood that the UE receives and decodes paging messages received via a PAC increases. This enables the UE (and/or a user thereof) to properly receive paging messages and act appropriately. For example, the UE may switch from an idle mode to a connected mode in response to receiving a paging message. In another example, the UE may properly receive an alert (via a paging message that alerts a user of the UE of a public safety, an emergency, or threat alert), thereby enabling the user to take the necessary precautionary measures. By providing a per-user indication, a UE may determine whether a paging message is intended therefor utilizing less compute resources (e.g., processing cycles, memory, power, etc.).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving, from a network node, an indication of a paging alert channel (PAC), wherein the indication is associated with at least a subset of subgroup identifiers of a plurality of UEs associated with a same paging occasion, wherein each of the plurality of UEs is configured to receive the indication of the PAC associated with the same paging occasion; and communicating at least one message with the network node based on the indication of the PAC.

Aspect 2 is the method of aspect 1, wherein receiving the indication of the PAC comprises: receiving, from the network node via the PAC, the indication of the PAC.

Aspect 3 is the method of aspect 2, wherein the PAC comprises a physical downlink control channel (PDCCH).

Aspect 4 is the method of any of aspects 1 to 3, wherein the indication indicates at least one of the subgroup identifiers of the plurality of UEs associated with the same paging occasion.

Aspect 5 is the method of any of aspects 1 to 4, wherein the PAC is associated with the subset based on at least one of: a physical downlink control channel (PDCCH) candidate index associated with the PAC, wherein the PDCCH candidate index is associated with a PDCCH monitoring occasion; or at least one radio network temporary identifier (RNTI) associated with the PAC.

Aspect 6 is the method of aspect 5, wherein the subset of the subgroup identifiers is associated with at least one of: the PDCCH candidate index; a first RNTI of the at least one RNTI; or the PDCCH monitoring occasion.

Aspect 7 is the method of aspect 6, wherein the PAC comprises one or more codepoints that each indicate a respective subgroup identifier in the subset of subgroup identifiers of the plurality of UEs.

Aspect 8 is the method of aspect 7, wherein each of the one or more codepoints is based on: a subgroup identifier in the subset of subgroup identifiers, wherein the subgroup identifier corresponds to at least one UE of the plurality of UEs; a first number of PDCCH monitoring occasions associated with the same paging occasion; a second number of PDCCH candidate indexes in each PDCCH monitoring occasion of the PDCCH monitoring occasions; a third number of the at least one RNTI; and a fourth number of the one or more codepoints.

Aspect 9 is the method of any of aspects 1 to 8, wherein receiving, from the network node, the indication of the PAC comprises: receiving the indication of the PAC a plurality of times based on: a first number of beams configured by the network node; a second number of physical downlink control channel (PDCCH) monitoring occasions associated with the same paging occasion; and a third number corresponding to a configured number of times the PAC is to be repeated in a beam.

Aspect 10 is the method of any of aspects 1 to 9, wherein the PAC comprises a plurality of cyclic redundancy check (CRC) bits.

Aspect 11 is the method of any of aspects 1 to 10, wherein the at least one message comprises at least one of: a paging early indication (PEI) physical downlink control channel (PDCCH); a paging PDCCH; an uplink random access message; or an alert.

Aspect 12 is the method of any of aspects 1 to 11, further comprising: switching from an idle mode to a connected mode based on the communication of the at least one message.

Aspect 13 is a method of wireless communication at a network node, comprising: providing, for at least one user equipment (UE), an indication of a paging alert channel (PAC), wherein the indication is associated with at least a subset of subgroup identifiers of at least one UE associated with a same paging occasion, wherein each of the at least one UE is configured to receive the indication of the PAC associated with the same paging occasion; and communicating at least one message with the at least one UE based on the indication of the PAC.

Aspect 14 is the method of aspect 13, wherein providing the indication of the PAC comprises: providing, for the at least one UE via the PAC, the indication of the PAC.

Aspect 15 is the method of aspect 14, wherein the PAC comprises a physical downlink control channel (PDCCH).

Aspect 16 is the method of any of aspects 13 to 15, wherein the indication indicates at least one of the subgroup identifiers of the at least one UE associated with the same paging occasion.

Aspect 17 is the method of any of aspects 13 to 16, wherein the PAC is associated with the subset based on at least one of: a physical downlink control channel (PDCCH) candidate index associated with the PAC, wherein the PDCCH candidate index is associated with a PDCCH monitoring occasion; or at least one radio network temporary identifier (RNTI) associated with the PAC.

Aspect 18 is the method of aspect 17, wherein the subset of the subgroup identifiers is associated with at least one of: the PDCCH candidate index; a first RNTI of the at least one RNTI; or the PDCCH monitoring occasion.

Aspect 19 is the method of aspect 18, wherein the PAC comprises one or more codepoints that each indicate a respective subgroup identifier in the subset of subgroup identifiers of the at least one UE.

Aspect 20 is the method of aspect 19, wherein each of the one or more codepoints is based on: a subgroup identifier in the subset of subgroup identifiers, wherein the subgroup identifier corresponds to one or more UEs of the at least one UE; a first number of PDCCH monitoring occasions associated with the same paging occasion; a second number of PDCCH candidate indexes in each PDCCH monitoring occasion of the PDCCH monitoring occasions; a third number of the at least one RNTI; and a fourth number of the one or more codepoints.

Aspect 21 is the method of any of aspects 13 to 20, wherein providing, for the at least one UE, the first indication of the PAC comprises: providing the indication of the PAC a plurality of times based on: a first number of beams configured by the network node; a second number of physical downlink control channel (PDCCH) monitoring occasions associated with the same paging occasion; and a third number corresponding to a configured number of times the PAC is to be repeated in a beam.

Aspect 22 is the method of any of aspects 13 to 21, wherein the PAC comprises a plurality of cyclic redundancy check (CRC) bits.

Aspect 23 is the method of any of aspects 13 to 22, wherein the at least one message comprises at least one of: a paging early indication (PEI) physical downlink control channel (PDCCH); a paging PDCCH; an uplink random access message; or an alert.

Aspect 24 is the method of any of aspects 13 to 23, wherein the at least one message is configured to cause the at least one UE to switch from an idle mode to a connected mode.

Aspect 25 is an apparatus for wireless communication at a UE. The apparatus includes at least one memory; and at least one processor coupled to the at least one memory and, based at least in part on information stored in the at least one memory, the at least one processor, individually or in any combination, is configured to implement any of aspects 1 to 12.

Aspect 26 is the apparatus of aspect 25, further including at least one of a transceiver or an antenna coupled to the at least one processor.

Aspect 27 is an apparatus for wireless communication at a network node. The apparatus includes at least one memory; and at least one processor coupled to the at least one memory and, based at least in part on information stored in the at least one memory, the at least one processor, individually or in any combination, is configured to implement any of aspects 13 to 24.

Aspect 28 is the apparatus of aspect 27, further including at least one of a transceiver or an antenna coupled to the at least one processor.

Aspect 29 is an apparatus for wireless communication including means for implementing any of aspects 1 to 12.

Aspect 30 is an apparatus for wireless communication including means for implementing any of aspects 13 to 24.

Aspect 31 is a computer-readable medium (e.g., a non-transitory computer-readable medium) storing computer executable code, where the code when executed by at least one processor causes the at least one processor, individually or in any combination, to implement any of aspects 1 to 12.

Aspect 32 is a computer-readable medium (e.g., a non-transitory computer-readable medium) storing computer executable code, where the code when executed by at least one processor causes the at least one processor, individually or in any combination, to implement any of aspects 13 to 24.

What is claimed is:

1. An apparatus for wireless communication at a user equipment (UE), comprising:
 at least one memory; and
 at least one processor coupled to the at least one memory and, based at least in part on information stored in the at least one memory, the at least one processor is configured to:
  receive, from a network node, an indication of a paging alert channel (PAC), wherein the indication is associated with at least a subset of subgroup identifiers of a plurality of UEs associated with a same paging occasion, wherein each of the plurality of UEs is configured to receive the indication of the PAC associated with the same paging occasion, wherein the same paging occasion is associated with a plurality of monitoring occasion sets, wherein each monitoring occasion set of the plurality of monitoring occasions sets is associated with a respective beam, and wherein the plurality of UEs and the PAC is associated with a non-terrestrial network (NTN); and
  communicate at least one message with the network node based on the indication of the PAC.

2. The apparatus of claim 1, wherein, to receive the indication of the PAC, the at least one processor is configured to:
 receive, from the network node via the PAC, the indication of the PAC.

3. The apparatus of claim 2, wherein the PAC comprises a physical downlink control channel (PDCCH).

4. The apparatus of claim 1, wherein the indication indicates at least one of the subgroup identifiers of the plurality of UEs associated with the same paging occasion.

5. The apparatus of claim 1, wherein the PAC is associated with the subset based on at least one of:
 a physical downlink control channel (PDCCH) candidate index associated with the PAC, wherein the PDCCH candidate index is associated with a PDCCH monitoring occasion; or
 at least one radio network temporary identifier (RNTI) associated with the PAC.

6. The apparatus of claim 5, wherein the subset of the subgroup identifiers is associated with at least one of:
 the PDCCH candidate index;
 a first RNTI of the at least one RNTI; or
 the PDCCH monitoring occasion.

7. The apparatus of claim 6, wherein the PAC comprises one or more codepoints that each indicate a respective subgroup identifier in the subset of subgroup identifiers of the plurality of UEs.

8. The apparatus of claim 7, wherein each of the one or more codepoints is based on:
 a subgroup identifier in the subset of subgroup identifiers, wherein the subgroup identifier corresponds to at least one UE of the plurality of UEs;
 a first number of PDCCH monitoring occasions associated with the same paging occasion;

a second number of PDCCH candidate indexes in each PDCCH monitoring occasion of the PDCCH monitoring occasions;

a third number of the at least one RNTI; and a fourth number of the one or more codepoints.

9. The apparatus of claim 1, wherein, to receive, from the network node, the indication of the PAC, the at least one processor is configured to:

receive the indication of the PAC a plurality of times based on:

a first number of beams configured by the network node;

a second number of physical downlink control channel (PDCCH) monitoring occasions associated with the same paging occasion, wherein the plurality of monitoring occasion sets is based on the second number; and a third number corresponding to a configured number of times the PAC is to be repeated in a beam.

10. The apparatus of claim 1, wherein the PAC comprises a plurality of cyclic redundancy check (CRC) bits.

11. The apparatus of claim 1, wherein the at least one message comprises at least one of:

a paging early indication (PEI) physical downlink control channel (PDCCH);

a paging PDCCH;

an uplink random access message; or an alert.

12. The apparatus of claim 1, wherein the at least one processor is further configured to:

switch from an idle mode to a connected mode based on the communication of the at least one message.

13. An apparatus for wireless communication at a network node, comprising:

at least one memory; and at least one processor coupled to the at least one memory and, based at least in part on information stored in the at least one memory, the at least one processor is configured to:

provide, for at least one user equipment (UE), an indication of a paging alert channel (PAC), wherein the indication is associated with at least a subset of subgroup identifiers of at least one UE associated with a same paging occasion, wherein each of the at least one UE is configured to receive the indication of the PAC associated with the same paging occasion, wherein the same paging occasion is associated with a plurality of monitoring occasion sets, wherein each monitoring occasion set of the plurality of monitoring occasions sets is associated with a respective beam, and wherein the at least one UE and the PAC is associated with a non-terrestrial network (NTN); and communicate at least one message with the at least one UE based on the indication of the PAC.

14. The apparatus of claim 13, wherein, to provide the indication of the PAC, the at least one processor is configured to:

provide, for the at least one UE via the PAC, the indication of the PAC.

15. The apparatus of claim 14, wherein the PAC comprises a physical downlink control channel (PDCCH).

16. The apparatus of claim 13, wherein the indication indicates at least one of the subgroup identifiers of the at least one UE associated with the same paging occasion.

17. The apparatus of claim 13, wherein the PAC is associated with the subset based on at least one of:

a physical downlink control channel (PDCCH) candidate index associated with the PAC, wherein the PDCCH candidate index is associated with a PDCCH monitoring occasion; or at least one radio network temporary identifier (RNTI) associated with the PAC.

18. The apparatus of claim 17, wherein the subset of the subgroup identifiers is associated with at least one of:

the PDCCH candidate index;

a first RNTI of the at least one RNTI; or the PDCCH monitoring occasion.

19. The apparatus of claim 18, wherein the PAC comprises one or more codepoints that each indicate a respective subgroup identifier in the subset of subgroup identifiers of the at least one UE.

20. The apparatus of claim 19, wherein each of the one or more codepoints is based on:

a subgroup identifier in the subset of subgroup identifiers, wherein the subgroup identifier corresponds to one or more UEs of the at least one UE;

a first number of PDCCH monitoring occasions associated with the same paging occasion;

a second number of PDCCH candidate indexes in each PDCCH monitoring occasion of the PDCCH monitoring occasions;

a third number of the at least one RNTI; and a fourth number of the one or more codepoints.

21. The apparatus of claim 13, wherein, to provide, for the at least one UE, the indication of the PAC, the at least one processor is configured to:

provide the indication of the PAC a plurality of times based on:

a first number of beams configured by the network node;

a second number of physical downlink control channel (PDCCH) monitoring occasions associated with the same paging occasion, wherein the plurality of monitoring occasion sets is based on the second number; and a third number corresponding to a configured number of times the PAC is to be repeated in a beam.

22. The apparatus of claim 13, wherein the PAC comprises a plurality of cyclic redundancy check (CRC) bits.

23. The apparatus of claim 13, wherein the at least one message comprises at least one of:

a paging early indication (PEI) physical downlink control channel (PDCCH);

a paging PDCCH;

an uplink random access message; or an alert.

24. The apparatus of claim 13, wherein the at least one message is configured to cause the at least one UE to switch from an idle mode to a connected mode.

25. A method of wireless communication at a user equipment (UE), comprising:

receiving, from a network node, an indication of a paging alert channel (PAC), wherein the indication is associated with at least a subset of subgroup identifiers of a plurality of UEs associated with a same paging occasion, wherein each of the plurality of UEs is configured to receive the indication of the PAC associated with the same paging occasion, wherein the same paging occasion is associated with a plurality of monitoring occasion sets, wherein each monitoring occasion set of the plurality of monitoring occasions sets is associated with a respective beam, and wherein the plurality of UEs and the PAC is associated with a non-terrestrial network (NTN); and communicating at least one message with the network node based on the indication of the PAC.

26. The method of claim 25, wherein receiving the indication of the PAC comprises:

receiving, from the network node via the PAC, the indication of the PAC.

27. The method of claim 26, wherein the PAC comprises a physical downlink control channel (PDCCH).

28. A method of wireless communication at a network node, comprising:

providing, for at least one user equipment (UE), an indication of a paging alert channel (PAC), wherein the indication is associated with at least a subset of sub-group identifiers of at least one UE associated with a same paging occasion, wherein each of the at least one UE is configured to receive the indication of the PAC associated with the same paging occasion, wherein the same paging occasion is associated with a plurality of monitoring occasion sets, wherein each monitoring occasion set of the plurality of monitoring occasions sets is associated with a respective beam, and wherein the at least one UE and the PAC is associated with a non-terrestrial network (NTN); and communicating at least one message with the at least one UE based on the indication of the PAC.

29. The method of claim 28, wherein providing the indication of the PAC comprises:

providing, for the at least one UE via the PAC, the indication of the PAC.

30. The method of claim 29, wherein the PAC comprises a physical downlink control channel (PDCCH).

* * * * *